United States Patent
Kawamata et al.

(10) Patent No.: US 10,584,429 B2
(45) Date of Patent: Mar. 10, 2020

(54) METHOD OF PRODUCING LIQUID CRYSTAL POLYESTER FIBERS

(71) Applicant: Toray Industries, Inc., Tokyo (JP)

(72) Inventors: Chieko Kawamata, Mishima (JP); Yusuke Ono, Mishima (JP); Hiroo Katsuta, Mishima (JP); Yoshitsugu Funatsu, Mishima (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/017,205

(22) Filed: Jun. 25, 2018

(65) Prior Publication Data

US 2018/0305841 A1 Oct. 25, 2018

Related U.S. Application Data

(62) Division of application No. 14/007,703, filed as application No. PCT/JP2012/056247 on Mar. 12, 2012, now abandoned.

(30) Foreign Application Priority Data

| Mar. 29, 2011 | (JP) | 2011-072020 |
| Mar. 30, 2011 | (JP) | 2011-076158 |
| Dec. 1, 2011 | (JP) | 2011-263399 |

(51) Int. Cl.

| C08G 63/16 | (2006.01) |
| C08G 63/18 | (2006.01) |
| C08G 63/181 | (2006.01) |
| C08G 63/183 | (2006.01) |
| C08G 63/19 | (2006.01) |
| C08G 63/191 | (2006.01) |
| C08G 63/60 | (2006.01) |
| C08G 63/80 | (2006.01) |
| C08J 7/12 | (2006.01) |
| D01D 5/08 | (2006.01) |
| D01D 10/02 | (2006.01) |
| D01D 10/06 | (2006.01) |
| D06M 11/68 | (2006.01) |
| D06M 11/69 | (2006.01) |
| D06M 11/70 | (2006.01) |
| D06M 11/71 | (2006.01) |
| D06M 11/77 | (2006.01) |
| D06M 13/282 | (2006.01) |
| D01F 6/62 | (2006.01) |
| D01F 6/84 | (2006.01) |
| D06M 11/79 | (2006.01) |
| D06M 13/292 | (2006.01) |
| D06M 23/08 | (2006.01) |
| D02J 13/00 | (2006.01) |
| B29D 99/00 | (2010.01) |
| C08G 63/40 | (2006.01) |
| D06M 101/32 | (2006.01) |

(52) U.S. Cl.
CPC ........... D01F 6/62 (2013.01); B29D 99/0078 (2013.01); C08G 63/40 (2013.01); D01F 6/84 (2013.01); D02J 13/001 (2013.01); D06M 11/79 (2013.01); D06M 13/292 (2013.01); D06M 23/08 (2013.01); D06M 2101/32 (2013.01); D10B 2331/04 (2013.01); Y10T 442/183 (2015.04)

(58) Field of Classification Search
CPC .... B29D 99/0078; C08G 63/16; C08G 63/18; C08G 63/181; C08G 63/183; C08G 63/19; C08G 63/191; C08G 63/40; C08G 63/60; C08G 63/80; C08J 7/12; D01D 5/08; D01D 10/02; D01D 10/06; D01F 6/62; D01F 6/84; D06M 11/68; D06M 11/69; D06M 11/70; D06M 11/71; D06M 11/77; D06M 11/79; D06M 13/282; D06M 13/292; D06M 23/08; D06M 2101/32; D10B 2331/04
USPC .............. 264/211.14, 211.15, 233; 8/115.54, 8/115.56, 115.64; 528/272, 274, 286, 528/287, 308, 308.1, 308.2, 480, 487, 528/488, 490
See application file for complete search history.

(56) References Cited

U.S. PATENT DOCUMENTS

| 4,668,454 A | 5/1987 | Dickerson, Jr. et al. |
| 4,721,587 A | 1/1988 | Carney et al. |
| 2010/0104870 A1† | 4/2010 | Funatsu |
| 2011/0318982 A1* | 12/2011 | Funatsu .................. D01F 6/62 442/49 |

FOREIGN PATENT DOCUMENTS

| EP | 0 209 242 A2 | 1/1987 |
| EP | 0 422 218 A1 | 4/1991 |
| EP | 2 123 807 A1 | 11/2009 |
| JP | 59-179818 A | 10/1984 |

(Continued)

OTHER PUBLICATIONS

Machine translation of JP-01207319-A (published on Aug. 21, 1989).*

(Continued)

*Primary Examiner* — Leo B Tentoni
(74) *Attorney, Agent, or Firm* — DLA Piper LLP (US)

(57) ABSTRACT

A method of producing a liquid crystalline polyester fiber includes subjecting a yarn prepared by melt spinning a liquid crystalline polyester to a solid-phase polymerization after applying inorganic particles (A) and a phosphate-based compound (B) to the yarn. The method can optionally include cleaning the liquid crystalline polyester fiber after the solid-phase polymerization.

5 Claims, No Drawings

(56) References Cited

FOREIGN PATENT DOCUMENTS

| | | | |
|---|---|---|---|
| JP | 59179818 | † | 10/1984 |
| JP | 62-149934 A | | 7/1987 |
| JP | 62149934 | † | 7/1987 |
| JP | 01207319 A | * | 8/1989 ............ C08G 63/60 |
| JP | 4-15296 B2 | | 3/1992 |
| JP | 05-302218 A | | 11/1993 |
| JP | 7-49624 B2 | | 5/1995 |
| JP | 2674062 | † | 7/1997 |
| JP | 2674062 B2 | | 11/1997 |
| JP | 2003-336124 A | | 11/2003 |
| JP | 2006-207054 A | | 8/2006 |
| JP | 2006-299476 A | | 11/2006 |
| JP | 2009-228177 A | | 10/2009 |
| JP | 2009-235633 A | | 10/2009 |
| JP | 2010-084301 A | | 4/2010 |
| JP | 2010-209495 A | | 9/2010 |
| JP | 2010-248681 A | | 11/2010 |
| JP | 2011-168930 A | | 9/2011 |
| WO | 2008/105439 A1 | | 9/2008 |
| WO | 2008105439 | † | 9/2008 |
| WO | 2009/081528 A1 | | 7/2009 |
| WO | WO-2010103986 A1 | * | 9/2010 ............ D01F 6/62 |

OTHER PUBLICATIONS

Ryohei Oda et al. (Sep. 1, 1969), *Sen 'i-yo yuzai* (Oils for fiber): The Textile Machinery Society of Japan, pp. 27, 28, 37-44, 217-237, 265-269, 275 and 276, with partial English translation.

"Modification of Liquid Crystalline Polymer and Recent Applied Technology," Technical Information Association, 2006, pp. 235-256, with partial English translation.

Chinese First Office Action dated Aug. 14, 2014 with English translation from corresponding Chinese Application or Publication No. 201280015765.1.

Supplementary European Search Report dated Sep. 8, 2014 from corresponding European Application No. 12764969.7.

Second Chinese Office Action dated May 18, 2015 of corresponding Chinese Application No. 201280015765.1 with English translation.

European Communication dated Jun. 25, 2015 of corresponding European Application No. 12764969.7 with Observations by Third Parties.

Korean Official Action dated Aug. 28, 2015 of corresponding Korean Patent Application No. 10-2013-7023218 with machine translation.

Third Chinese Official Action dated Sep. 28, 2015 of corresponding Chinese Patent Application No. 201280015765.1 with English translation.

Korean Written Opinion dated May 9, 2016 of corresponding Korean Patent Application No. 10-2013-7023218 with English translation.

Notice of Opposition to a European Patent dated Jan. 26, 2017 of corresponding European Application No. 12764969.7 with Annex 1 comprising Facts and Arguments.

Notification of Reason for Revocation dated Feb. 10, 2017 of corresponding Japanese Patent No. 5915227 with English translation.

\* cited by examiner
† cited by third party

METHOD OF PRODUCING LIQUID CRYSTAL POLYESTER FIBERS

RELATED APPLICATIONS

This application is a divisional of U.S application Ser. No. 14/007,703, with a filing date of Sep. 26, 2013, which is a § 371 of PCT/JP2012/056247 filed Mar. 12, 2012, which claims priority to Japanese Patent Application No. 2011-072020, filed Mar. 29, 2011, Japanese Patent Application No. 2011-076158, filed Mar. 30, 2011, and Japanese Patent Application No. 2011-263399, filed Dec. 1, 2011.

TECHNICAL FIELD

This disclosure relates to a liquid crystalline polyester fiber that exhibits high strength and high elastic modulus and is excellent in process passability, and a method of producing the liquid crystalline polyester fiber.

BACKGROUND

It is known that a liquid crystalline polyester is a polymer comprising a rigid molecular chain, and highest strength and elastic modulus can be obtained among fibers prepared by melt spinning by highly orienting the molecular chain in the fiber axis direction in the melt spinning and further carrying out solid phase polymerization. Further, it is also known that the liquid crystalline polyester can be improved in thermal resistance and dimensional stability by solid phase polymerization because the molecular weight increases and the melting point elevates by solid phase polymerization (see, for example, Japanese Patent Application Laid-Open Publication No. 2010-209495 (sixth and seventh pages)). Thus, in a liquid crystalline polyester fiber, the high strength, high elastic modulus, and excellent thermal resistance and thermal dimensional stability are exhibited by carrying out solid phase polymerization. A solid-phase polymerization reaction is generally carried out at high temperatures around the melting point. Because of this, fusion bonding between yarns tends to take place. For the purpose of preventing the fusion bonding causing deteriorated characteristics and fibrillation of the yarn, it is an important point of technique in the production of the liquid crystalline polyester fiber to add a solid-phase polymerization oil agent.

Meanwhile, the solid-phase polymerization oil agent remains on the fiber surface after the solid-phase polymerization and in turn accumulates on guides, rollers, or tension providers in post processing steps of fibers, for example, a weaving step, thereby generating waste called scum. Because contamination of this scum into products causes product defects or yarn breakage by increased tension fluctuation, it is also an important point of technique in the production of the liquid crystalline polyester fiber to clean and remove the solid-phase polymerization oil agent after the solid-phase polymerization.

As this solid-phase polymerization oil agent, fluorine-based or silicone-based organic compounds with thermal resistance have been employed thus far. What has been proposed is, for example, utilization of polydimethylsiloxane which is water emulsifiable, easy to applied to the fiber surface and thermal resistable at high temperatures (Japanese Patent Application Laid-Open Publication No. 2010-209495 (sixth and seventh pages) and Japanese Patent Application Laid-Open Publication No. 2010-248681 (eleventh page)). That is, according to Japanese Patent Application Laid-Open Publication No. 2010-209495 (sixth and seventh pages) and Japanese Patent Application Laid-Open Publication No. 2010-248681 (eleventh page), a liquid crystalline polyester fiber exhibiting a very low amount of oil adhesion is obtained by applying polydimethylsiloxane with high thermal resistance as a solid-phase polymerization oil agent and carrying out a cleaning-heat treatment after the solid-phase polymerization.

Further, also known is a technique of utilizing inorganic particles with thermal resistance, instead of the used of the organic compound, as solid-phase polymerization oil agent (Japanese Patent Application Laid-Open Publication No. 2011-168930 (second and eighth pages)).

It was revealed that, because polydimethylsiloxane used in the above method of production described in Japanese Patent Application Laid-Open Publication No. 2010-209495 (sixth and seventh pages) and Japanese Patent Application Laid-Open Publication No. 2010-248681 (eleventh page) caused gelling by cross-linking reaction among polydimethylsiloxane under conditions of the solid-phase polymerization and the gelled product solidly adhered to the fiber surface, polydimethylsiloxane remained on the fiber even after mechanical cleaning such as ultrasonic cleaning in addition to cleaning by surfactants. That is, an amount of oil adhesion in the above documents was calculated from yarn weight ($W_0$) before the cleaning and yarn weight ($W_1$) after the ultrasonic cleaning using the following equation, and it was found that, because the gelled product was not completely dropped off at the time of the ultrasonic cleaning, although the amount of adhesion of a solid-phase polymerization oil agent was calculated as a low value, the gelled product of solid-phase polymerization oil agent whose amount could not be measured as the amount of oil adhesion firmly adhered and remained on the fiber:

Amount of oil adhesion (wt %)=$(W_0-W_1)\times100/W_1$.

Due to this, according to the method of production described in Japanese Patent Application Laid-Open Publication No. 2010-209495 (sixth and seventh pages) and Japanese Patent Application Laid-Open Publication No. 2010-248681 (eleventh page), a yarn hold very low amount of oil adhesion by strengthening the cleaning in the cleaning step after the solid-phase polymerization. In addition, although, in Examples, effects of suppressing generation of scum and contamination of the scum into the product were confirmed in a weaving step in which a small amount of liquid crystalline polyester fiber was picked to weave as welf, a very small amount of scum was generated, and when extended evaluation was carried out, it was revealed that tension fluctuation by accumulation of the gelled product onto guides, tension providers or the like increased with time; and yarn breakage or contamination of the scum into the product occurred.

Further, in Japanese Patent Application Laid-Open Publication No. 2011-168930 (second and eighth pages), a fiber is applied with swelling clay minerals having properties of swelling and dispersing in water and subjected to solid-phase polymerization. The fiber is immersed in water after the solid-phase polymerization, which enabled dropping solid-phase polymerization oil agent.

However, when such inorganic particles are solely applied on the fiber, or dispersed in a common spinning oil agent or the like and then applied on the fiber, the inorganic particles were firmly adhered on the fiber surface after the solid-phase polymerization step. Thus, similarly to the above examples of polydimethylsiloxane, although the fiber had a very small amount of oil adhesion after the cleaning, the inorganic particles dropped off by being scratched by guides or tension providers in the weaving step, which caused occurrence of tension fluctuations or product defects by product contamination.

As mentioned above, a solid-phase polymerization oil agent for the liquid crystalline polyester fiber that has both effects of suppressing fusion bonding and excellent cleaning properties has not been developed thus far. Thus, a liquid crystalline polyester fiber that is industrially utilizable with suppressed scum generation and tension fluctuation in the weaving step, and is excellent in process passability and product yield; and production technique thereof have not been proposed. The development thereof has been wanted.

It could therefore be helpful to provide a liquid crystalline polyester fiber that has a small amount of deposit (scum) in the weaving step, small fluctuation of running tension, and is excellent in process passability and product yield in the weaving step; as well as a method of production thereof and a mesh woven fabric thereof.

SUMMARY

We thus provide a liquid crystalline polyester fiber exhibiting a running tension fluctuation range (R) of 5 cN or less and an oil adhesion rate of 3.0 wt % or less.

We also provide a method of producing a liquid crystalline polyester fiber comprising applying inorganic particles (A) and a phosphate-based compound (B) to a liquid crystalline polyester yarn prepared by melt spinning, followed by solid-phase polymerization.

We further provide a mesh woven comprising the above liquid crystalline polyester fiber.

The amount of scum generated by the liquid crystalline polyester fiber is preferably 0.01 g or less.

The strength of the liquid crystalline polyester fiber is preferably 12.0 cN/dtex or more.

In the liquid crystalline polyester fiber, a half width of an endothermic peak ($Tm_1$) observed when measured under a condition of heating from 50° C. at a temperature elevation rate of 20° C./min in differential calorimetry is preferably 15° C. or higher.

The liquid crystalline polyester fiber is preferably a monofilament.

The liquid crystalline polyester fiber is preferably composed of a single polymer component.

The liquid crystalline polyester fiber is preferably composed of the following structural units (I), (II), (III), (IV), and (V):

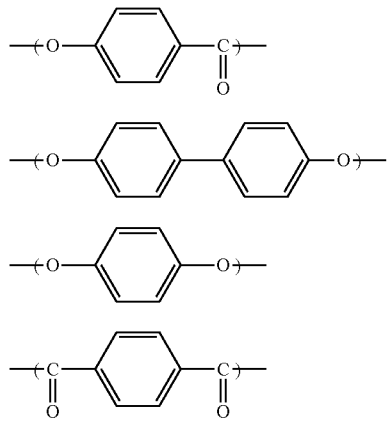

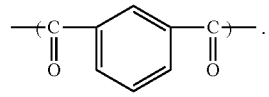

The method of producing the liquid crystalline polyester fiber preferably comprises cleaning the liquid crystalline polyester fiber after the solid-phase polymerization.

The method of producing the liquid crystalline polyester fiber preferably comprises carrying out a high temperature heat treatment at a temperature of an endothermic peak temperature ($Tm_1$) of the liquid crystalline polyester fiber after the cleaning +10° C. or higher.

In the method of producing the liquid crystalline polyester fiber, the inorganic particles (A) are one or more selected from silica and silicates.

In the method of producing the liquid crystalline polyester fiber, the phosphate-based compound (B) preferably comprises any of compounds represented by the following chemical formulae (1) to (3) or a combination thereof, and satisfies the following conditions 1 to 4:

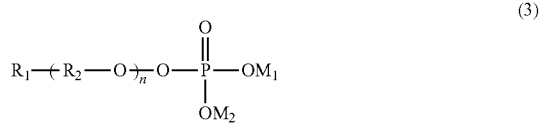

Condition 1: $R_1$ and $R_2$ represent a hydrocarbon group.
Condition 2: $M_1$ represents an alkali metal.
Condition 3: $M_2$ represents a group selected from an alkali metal, a hydrogen atom, a hydrocarbon group and a hydrocarbon group containing an oxygen atom(s).
Condition 4: n represents an integer of 1 or more.

Because the liquid crystalline polyester fiber exhibits small fluctuation of running tension, yarn breakage ascribed to tension fluctuation in high-order processing of fibers such as knit weaving is suppressed and thus the fiber is excellent in process passability, allows for densification of weave density, and can improve weavability. Further, product defects by tight picks of a product or contamination of scum can be suppressed, thereby improving product yield. In particular for applications for filters and screen gauzes which require high-mesh woven fabrics, what can be attained are to densify weave density (to make a mesh higher) to improve performance, make an opening area larger, decrease the defects of the openings, and improve weavability.

By the method of producing the liquid crystalline polyester fiber, a fiber capable of providing a liquid crystalline polyester fiber which has high strength and high elastic modulus, has a small amount of deposit (scum) in a weaving step, exhibits small fluctuation of running tension, is excellent in process passability, and thereby shows markedly improved product yield of woven fabric. In such a method of production, by further cleaning a liquid crystalline polyester fiber after solid-phase polymerization, solid-phase polymerization oil agent can be readily removed. As seen above, by carrying out the cleaning, the liquid crystalline polyester fiber of markedly improved process stability in the weaving step and product yield as described above can be obtained.

DETAILED DESCRIPTION

A liquid crystalline polyester fiber will be described in detail below.

The liquid crystalline polyester is a polyester capable of forming an anisotropic melting phase (showing a liquid crystal property) when molten. These characteristics can be recognized, for example, by placing a sample of a liquid crystalline polyester on a hot stage, heating it under a nitrogen atmosphere, and observing a transmitted light of the sample under a polarized radiation.

Examples of the liquid crystalline polyester include (i) a polymer of an aromatic oxycarboxylic acid; (ii) a polymer of an aromatic dicarboxylic acid with an aromatic diol or an aliphatic diol; and (iii) a copolymer comprising an aromatic oxycarboxylic acid, an aromatic dicarboxylic acid and an aromatic diol or an aliphatic diol. Of these a polymer that is solely composed of aromatic series is preferred. The polymer that is solely composed of aromatic series develops excellent strength and elastic modulus when made into a fiber. Further, common methods including conventionally known methods can be employed for polymerization formulation of liquid crystalline polyester.

Examples of the aromatic oxycarboxylic acid include hydroxy benzoic acid, hydroxy naphthoic acid; and an alkyl, alkoxy or halogen substituted product thereof.

Further, examples of the aromatic dicarboxylic acid include terephthalic acid, isophthalic acid, diphenyl dicarboxylic acid, naphthalene dicarboxylic acid, diphenylether dicarboxylic acid, diphenoxyethane dicarboxylic acid, diphenylethane dicarboxylic acid; and an alkyl, alkoxy or halogen substituted product thereof.

Further, examples of the aromatic diol include hydroquinone, resorcinol, dihydroxybiphenyl, naphthalene diol, and an alkyl, alkoxy or halogen substituted product thereof. Examples of the aliphatic diol include ethylene glycol, propylene glycol, butane diol, and neopentyl glycol.

Examples of preferred liquid crystalline polyesters include a liquid crystalline polyester with p-hydroxy benzoic acid component and 6-hydroxy 2-naphthoic acid component being copolymerized; a liquid crystalline polyester with p-hydroxy benzoic acid component, 4,4'-dihydroxy biphenyl component, and isophthalic acid component and/or terephthalic acid component being copolymerized; and a liquid crystalline polyester with p-hydroxy benzoic acid component, 4,4'-dihydroxy biphenyl component, isophthalic acid component, terephthalic acid component and hydroquinone component being copolymerized.

The combination of shown above decreases the symmetric property of a molecular chain, thereby lowering the melting point of liquid crystalline polyester to or below the decomposition point and allows the liquid crystalline polyester to have the melting point at which melt spinning is feasible. Therefore, a good yarn formation property can be exhibited at a spinning temperature set between the melting point and the thermal decomposition temperature of the polymer, a fiber uniform in the lengthwise direction can be obtained, and because of an appropriate crystallinity, the strength and elastic modulus of the fiber can be increased. A liquid crystalline polyester comprising the structural units (I), (II), (III), (IV) and (V) represented by the following chemical formula is preferred:

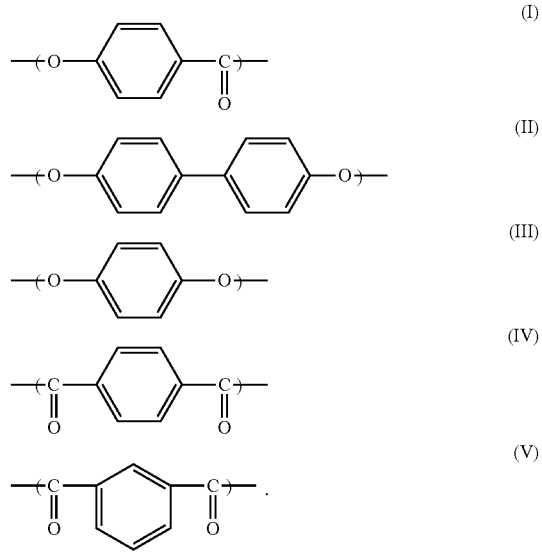

The "structural unit" refers to a unit capable of composing a repeated structure in a main chain of a polymer. The above combination of (I) to (V) is preferred in that it renders high linearity and thereby the elastic modulus can be increased.

By combining components comprising diols with a high linearity and a small bulk such as the structural units (II) and (III), the molecular chain can have an orderly structure with less disorder, and an interaction in a direction perpendicular to the fiber axis can be maintained because the crystallinity is not increased excessively. By this, in addition to obtain high strength and elastic modulus, a particularly excellent abrasion resistance can be obtained by carrying out a high temperature heat treatment after solid-phase polymerization.

Further, the above structural unit (I) preferably accounts for 40 to 85 mol % relative to the sum of the structural units (I), (II) and (III), more preferably 65 to 80 mol %, and still more preferably 68 to 75 mol %. By control in such a range, moderate crystallinity is achieved, results in high strength and elastic modulus and moderate melting point where the melt spinning is feasible.

The structural unit (II) preferably accounts for 60 to 90 mol % relative to the sum of the structural units (II) and (III), more preferably 60 to 80 mol %, and still more preferably at 65 to 75 mol %. By control in such a range, since the crystallinity does not increase excessively and the interaction in a direction perpendicular to the fiber axis can be maintained, the abrasion resistance can be improved by carrying out a high temperature heat treatment after solid-phase polymerization.

The structural unit (IV) preferably accounts for 40 to 95 mol % relative to the sum of the structural units (IV) and (V), more preferably 50 to 90 mol %, and still more preferably at 60 to 85 mol %. Because such a range allows the melting point of the polymer to be an appropriate range and, having good spinning ability at spinning temperature that is set between melting point and thermal decomposition temperature of the polymer, a fiber with uniformity in the lengthwise direction can be obtained. In addition to this, because the linearity of the polymer is moderately destroyed, the interaction in a direction perpendicular to the fiber axis can be enhanced and the abrasion resistance can be improved by a high temperature heat treatment after solid-phase polymerization.

Preferred ranges of the each of the structural units of the above liquid crystalline polyester that are preferably used are as follows. Note that the sum of the following structural units (I) to (V) is 100 mol %. The liquid crystalline polyester fiber can be suitably obtained by controlling the composition in these ranges:

Structural unit (I): 45 to 65 mol %
Structural unit (II): 12 to 18 mol %
Structural unit (III): 3 to 10 mol %
Structural unit (IV): 5 to 20 mol %
Structural unit (V): 2 to 15 mol %.

Further, it is preferable the total amount of the structural unit (IV) and (V) and the total amount of the structural unit (II) and (III) are substantially same in terms of mole.

In the liquid crystalline polyester, besides the above monomers, other monomers can be further copolymerized in a range where the liquid crystallinity is not impaired; and examples of other monomers include aromatic dicarboxylic acid such as adipic acid, azelaic acid, sebacic acid, or dodecanedionic acid; alicyclic dicarboxylic acid such as 1,4-cyclohexane dicarboxylic acid; polyether such as polyethylene glycol; polysiloxane; aromatic iminocarboxylic acid; aromatic diimine; and aromatic hdroxydiimine.

Further, in the liquid crystalline polyester, other polymers can be added or combined to use in a range where the desired effects are not impaired. Addition or combination use refers to, in mixing polymers or in a composite spinning yarn with two or more components, partially mixed used or complete use of other polymers as one component or plural components. As another polymer, a polyester, a vinyl-group polymer such as a polyolefine or a polystyrene, a polycarbonate, a polyamide, a polyimide, a polyphenylene sulfide, a polyphenylene oxide, a polysulfone, an aromatic polyketone, an aliphatic polyketone, a semi-aromatic polyester amide, a polyetheretherketone, or a fluoro resin may be added, suitable examples include polyphenylene sulfide, polyetheretherketone, nylon 6, nylon 66, nylon 46, nylon 6T, nylon 9T, polyethylene terephthalate, polypropylene terephthalate, polybutylene terephthalate, polyethylene naphthalate, polycyclohexane dimethanol terephthalate, and polyester 99M. When these polymers are added or combined to use, the melting point thereof is preferably set within the melting point of the liquid crystalline polyester ±30° C. because the yarn formation property is not impaired. To improve the strength, elastic modulus of the obtained fiber and to suppress fluff generation by detachment at polymer interface and yarn breakage, the amount added or combined to use is preferably 50 wt % or less, and more preferably 5 wt % or less. It is still more preferred that other polymers be substantially not added or combined to use.

In the liquid crystalline polyester, in a range where the desired effects are not impaired, a small amount of various additives may be contained such as an inorganic substance such as various metal oxides, kaoline and silica, a colorant, a delustering agent, a flame retardant, an anti-oxidant, an ultraviolet ray absorbent, an infrared ray absorbent, a crystalline nucleus agent, a fluorescent whitening agent, an end group closing agent, or a compatibility providing agent.

A fiber refers to a yarn that is spun by a common melt spinning method.

In the liquid crystalline polyester fiber, a fluctuation range of running tension (R) is 5 cN or less and preferably 4 cN or less. The fluctuation range of running tension (R) that is referred here is a value obtained by a method described in Section A in Examples. We paid attention to tension fluctuation as a factor that significantly affects process passability and product yield in a high-order step such as weaving a liquid crystalline polyester fiber or the like, and intensively studied to find out that there is good correlation between a fluctuation range of running tension (R) obtained by a method described in Section A in Examples, and process passability and product yield in a high-order processing step such as weaving. That is, with the fluctuation range of running tension (R) satisfying 5 cN or less, the tension fluctuation is particularly suppressed in production of woven fabric and the process passability in the weaving step dramatically improves.

Further, if the fluctuation range of running tension (R) exceeds 5 cN, a large fluctuation of running tension induce uneven tension of liquid crystalline polyester fiber in steps at the time of weaving step, thereby leading to deterioration of the process passability or product defects of the obtained woven fabric to cause a decrease in the product yield.

A method of making the fluctuation range of running tension (R) to 5 cN or less is not particularly restricted. For example, as described in a method of production that is described later, the fluctuation range of running tension (R) to 5 cN or less can be attained by subjecting the liquid crystalline polyester fiber to solid-phase polymerization after applying inorganic particles (A) and phosphate-based compound (B) and then cleaning the obtained fiber.

In the fiber, an oil adhesion rate is 3.0 wt % or less. The oil adhesion rate is a total adhesion rate of residual solid-phase polymerization oil agent and finishing oil agent remained on fibers after the cleaning, and refers to a value determined by a method described in Section D in Examples. With the oil adhesion rate being 3.0 wt % or less, the number of times of machine stopping can be reduced in post processing steps to improve weavability, wherein the machine stopping is caused by yarn breakage ascribed to aggregation and false adhere of fibers or for cleaning oil agent pollution. If the oil adhesion rate exceeds 3.0 wt %, aggregation of yarns ascribed to oil agents that are excessively adhered frequently occurs and the excessive oil agent falls off by scratch in the step to pollute stations. Further, from the viewpoint of preventing yarn breakage ascribed to the oil agent or station pollution to improve weavability, the oil adhesion rate is more preferably 2.0 wt % or less and still more preferably 1.5 wt % or less. The lower limit thereof is not particularly restricted. A finishing oil agent is usually added to the fiber for exerting effects such as lubricity in weaving. From the viewpoint of preventing scrape of the fiber in the weaving, the lower limit of the oil adhesion rate, which is a total adhesion rate residual solid-phase polymerization oil agent and finishing oil agent is, although it depends on the type of oil agent, usually about 0.5 wt % and more preferably 0.8 wt % or more.

In the liquid crystalline polyester fiber, the amount of scum generated is preferably 0.01 g or less for the viewpoint of suppressing scum generation in the weaving step to keep process stability, and suppressing contamination of scum into a product to improve product yield. It is more preferably 0.002 g or less. The amount of scum generated that is referred here is a value obtained by a method described in Section H in the Examples. The lower limit of the amount of scum generated is not particularly restricted, and it is practically about 0.0001 g from the viewpoint of balance between effort and effect in cleaning.

A method of making the amount of scum generated is 0.01 g or less is not particularly restricted. For example, as described in a method of production described later, the amount of scum generated is 0.01 g or less can be attained by subjecting the liquid crystalline polyester fiber to solid-phase polymerization after applying inorganic particles (A) and phosphate-based compound (B) and then cleaning the obtained fiber.

The number of filaments of the fiber can be freely selected and is preferably 50 or less, more preferably 20 or less to make a fiber product thinner or lighter in weight. In particular, because a monofilament whose filament number is one is a field in which suppressed scum generation and stable running tension are required, it can be in particular used suitably.

The single-fiber fineness of the fiber is preferably 18.0 dtex or less. The single-fiber fineness that is referred here is a value determined by a method described in Section B in Examples. By making the fiber thinner at a single-fiber fineness of 18.0 dtex or less, the molecular weight of the polymer is easy to increase when polymerized in solid phase at fibrous state, and the strength, elongation and elastic modulus improved. Provided are advantages that the flexibility of the fiber increases and the processability of the fiber improves, that the surface area increases and therefore the adhesion property thereof with a chemical solution such as an adhesive improves, and being formed as a gauze comprising monofilaments, that the thickness can be thinned, that the weave density can be increased, and that the opening (area of the opening portions) can be widened. The single-fiber fineness is more preferably 10.0 dtex or less, and still more preferably 7.0 dtex or less. Although the lower limit of the single-fiber fineness is not particularly restricted, a lower limit that can be achieved by a method of production described later is about 1.0 dtex.

For improved strength of a final product such as woven fabric or knit, the strength of the fiber is preferably 12.0 cN/dtex or more, more preferably 14.0 cN/dtex or more, and still more preferably 15.0 cN/dtex or more. Although the upper limit of the strength is not particularly restricted, the upper limit that can be achieved by a method of production described later is about 40.0 cN/dtex. The strength is a value determined by a method described in Section C in Examples.

The elongation of the fiber is preferably 1.0% or more and more preferably 2.0% or more. With the elongation being 1.0% or more, the impact absorbability of the fiber is improved, the process passability in high-order processing steps and the ease of handling are excellent, and in addition, because the impact absorbability is improved, the abrasion resistance is improved as well. Although the upper limit of the elongation is not particularly restricted, the upper limit that can be achieved by a method of production described later is about 10.0%. The elongation that is referred here is a value determined by a method described in Section C in Examples.

Further, to increase the elastic modulus of woven fabrics, the elastic modulus is preferably 500 cN/dtex or more, more preferably 600 cN/dtex or more, and still more preferably 700 cN/dtex or more. Although the upper limit of the elastic modulus is not particularly restricted, the upper limit that can be achieved by a method of production described later is about 1,500 cN/dtex. The elastic modulus that is referred is a value determined by a method described in Section C in Examples.

Because of the high strength and elastic modulus, it can be suitably used in applications such as ropes, fibers for reinforcing members such as a tension member, screen gauzes for printing and mesh woven fabrics for filters.

In the liquid crystalline polyester fiber a half width of an endothermic peak ($Tm_1$) observed when measured under a condition of heating from 50° C. at a temperature elevation rate of 20° C./min in differential calorimetry is preferably 15° C. or above. $Tm_1$ in this determination method represents a melting point of fiber, and relating to the peak shape, the wider the area of the peak, that is, the greater the heat of melting ($\Delta Hm_1$) is, the higher the degree of crystallization is, and the smaller the half width is, the higher the completion of crystallinity is. In the liquid crystalline polyester, by carrying out solid phase polymerization after spinning, $Tm_1$ elevates, $\Delta Hm_1$ increases and the half width decreases, that is, the degree of crystallization and the completion of crystallinity increase, and the strength and elastic modulus of the fiber are increased and the thermal resistance thereof is improved. On the other hand, although the abrasion resistance deteriorates, this is considered because a difference in structure between the crystal part and the amorphous part becomes remarkable by increase of the completion of crystallinity and therefore destruction occurs in the interface therebetween. Accordingly, in the fiber, it is preferred that the liquid crystallinity be decreased by increasing the half width of the peak up to a value of 15° C. such as one of a liquid crystalline polyester fiber which is not carried out with solid phase polymerization while maintaining a high $Tm_1$ and high strength, elongation, elastic modulus and thermal resistance that are the features of a fiber carried out with solid phase polymerization, and the abrasion resistance can be improved by decreasing the difference in structure between the crystal/amorphous parts which becomes a trigger of the destruction, disarraying the fibril structure, and softening the whole of the fiber. The higher the half width of peak at $Tm_1$ is, the higher the abrasion resistance is. Thus, the half width of peak at $Tm_1$ is preferably 20° C. or more. Although the upper limit is not particularly restricted, the upper limit that can be industrially achieved is about 80° C.

It is noted that, in the liquid crystalline polyester fiber, although the endothermic peak is one, two or more peaks may be observed depending on the fiber structure, for example, in the case of inadequate solid phase polymerization. In this case, the half width of peak refers to a value of the sum of the half width of each peak.

The melting point ($Tm_1$) of the fiber is preferably 300° C. or higher, more preferably 310° C. or higher, and still more preferably 320° C. or higher. By having such a high melting point, the thermal resistance and thermal dimensional stability are excellent and thus processing can be carried out at high temperatures even after completing a product, thereby leading to excellent post processability. Although the upper limit of $Tm_1$ is not particularly restricted, an upper limit that can be achieved is about 400° C.

Further, the value of the heat of melting $\Delta Hm_1$ varies depending on the composition of the structural unit of the liquid crystalline polyester, and is preferably 6.0 J/g or less. By decreasing $\Delta Hm_1$ to 6.0 J/g or less leads to reduction of the degree of crystallization, disarray of the fibril structure, and softening of the whole fiber, and a decrease in the difference in structure between the crystal/amorphous parts which becomes a trigger of the destruction improves the abrasion resistance. Because the abrasion resistance more improves with lower $\Delta Hm_1$, $\Delta Hm_1$ is preferably 5.0 J/g or less. The lower limit of $\Delta Hm_1$ is not particularly restricted and, to achieve high strength and elastic modulus, $\Delta Hm_1$ is preferably 0.5 J/g or more.

When the liquid crystalline polyester fibers are subjected to solid-phase polymerization, the molecular weight increases, and the strength, elongation, elastic modulus and thermal resistance increase, and at the same time, the degree of crystallization also increases, and the $\Delta Hm_1$ increases. If the degree of crystallization increases, the strength, elongation, elastic modulus and thermal resistance further increase, but the difference in structure between the crystal part and the amorphous part becomes remarkable, the interface therebetween is liable to be destroyed, and the abrasion resistance decreases. In contrast to this, it is preferred, from the viewpoint of improving the abrasion resistance, to have a low degree of crystallization such as that of a liquid crystalline polyester fiber which has not been subjected to the solid-phase polymerization, that is a low $\Delta Hm_1$, concurrently with maintaining the high strength, elastic modulus and thermal resistance by having a high molecular weight that is one of the features of the fiber which has been subjected to the solid-phase polymerization.

Such a fiber structure can be attained, for example, by subjecting a liquid crystalline polyester fiber obtained by the solid-phase polymerization, which is described later, to a heat treatment at a temperature of $Tm_1$ of the liquid crystalline polyester fiber +10° C. or higher.

$Tm_1$, half width of peak at $Tm_1$, $\Delta Hm_1$ of the liquid crystalline polyester fiber, which are described above, refers to values obtained by a method described in Section E in Examples.

It is preferred that a finishing oil agent be applied to the liquid crystalline polyester fiber to improve abrasion resistance and process passability by improved surface smoothness. The oil adhesion rate of finishing oil agent is preferably 0.1 wt % or more based on the fiber weight. The oil adhesion rate that is referred refers to a value determined by a method described in Section D in Examples. Because a higher oil content leads to more effects, it is preferably 0.5 wt % or more. Yet, if the oil content is too high, yarn breakage occurs because adhesion force between fibers increases and neighboring yarns gather together to falsely adhere, and process pollution takes place by accumulation of excessive oil agents on guides or tension providers by scratch in steps, which increases the number of times of machine stopping for a cleaning step and causes problems such as weavability defect. Therefore, it is preferably 3.0 wt % or less and 2.0 wt % or less.

As the type of finishing oil agent, a finishing oil agent for common polyester monofilament can be employed. To avoid decrease in process passability by scum generation in a weaving step, the finishing oil agent preferably does not contain particulates.

A method of producing of the liquid crystalline polyester fiber will now be described in detail below.

The melting point of the liquid crystalline polyester polymer is preferably 200 to 380° C. to widen the temperature range where the melt spinning is feasible, and more preferably 250 to 360° C. The melting point of the liquid crystalline polyester polymer refers to a value measured by a method described in Section E in Examples.

The weight average molecular weight of the liquid crystalline polyester determined in terms of a polystyrene-equivalent weight average molecular weight (hereinafter, referred to as "molecular weight") is preferably 30,000 or more. By having a molecular weight of 30,000 or more, an adequate viscosity can be provided at a spinning temperature and the yarn formation property can be improved. With a higher molecular weight, the strength, elongation and elastic modulus of the fiber to be obtained increase. If the molecular weight is too high, the viscosity becomes high and the flowability deteriorates, and ultimately it becomes impossible to flow, and therefore the molecular weight is preferably less than 250,000, and more preferably less than 200,000. The weight average molecular weight determined in terms of a polystyrene-equivalent weight average molecular weight that is referred here means a value measured by a method described in Section F in Examples.

The liquid crystalline polyester is preferably dried up before being subjected to melt spinning, from the viewpoint of suppressing foaming caused by water mixture and of enhancing the yarn formation property. Vacuum drying is more preferably carried out because the monomer remaining in the liquid crystalline polyester can be removed and thereby the yarn formation property is further enhanced. As for drying conditions, the vacuum drying is usually carried out at 100 to 200° C. for 8 to 24 hours.

In the melt spinning, although a known method can be used for melt extrusion of liquid crystalline polyester to prevent an ordered structure from being produced at the time of polymerization, an extruder-type extruding machine is preferably used. The extruded polymer is metered by a known metering device such as a gear pump through flow path, and after passing through a filter for removing extraneous materials, it is introduced into a die. At that time, the temperature (spinning temperature) from the polymer flow path to the die is preferably controlled at a temperature of the melting point of the liquid crystalline polyester or higher, and more preferably at a temperature of the melting point of the liquid crystalline polyester +10° C. or higher. Yet, if the spinning temperature is too high, the viscosity of the liquid crystalline polyester increases to deteriorate fluidity and yarn formation property, and therefore it is preferably 500° C. or lower, and more preferably 400° C. or lower. It is also possible to independently adjust each of the temperatures from the polymer flow path to the die. In this case, the discharge can be stabilized by controlling the temperature of a portion near the die higher than the temperature of an upstream portion thereof.

With regard to the discharge, it is preferred to make the hole diameter of the die smaller and to make the land length (a length of a straight part having the same length of the hole diameter of the die) longer, from the viewpoint of enhancing yarn formation property and uniformity of fineness. However, if the hole diameter is excessively small, because a clogging of a hole is liable to occur, the diameter is preferably 0.05 mm or more, and 0.50 mm or less, and is more preferably 0.10 mm or more, and 0.30 mm or less. If the land length is excessively long, the pressure loss becomes high and thus L/D defined as a quotient calculated by dividing the land length by the hole diameter is preferably 1.0 or more and 3.0 or less, and is more preferably 2.0 or more and 2.5 or less.

Further, the number of holes in the die can be selected as appropriate in accordance with applications and, to keep the uniformity, the number of holes in a single die is preferably 1,000 holes or less, and is more preferably 500 holes or less. The introduction hole positioned immediately above the die hole is preferably a straight hole, from the point of preventing increase of the pressure loss. A connecting portion between the introduction hole and the die hole is preferably formed in a taper shape from the viewpoint of suppressing an abnormal staying. Further, the lower limit of the number of holes may be one hole.

The polymer discharged from the die holes passes through heat insulating and cooling regions and is solidified, and is thereafter drawn up by a roller (godet roller) rotating at a constant speed. If the heat insulating region is excessively long, because the yarn formation property deteriorates, it is preferably 200 mm or less from the die surface, and is more preferably 100 mm or less. In the heat insulating region, it is possible for the atmosphere temperature to be increased by using a heating means, and a temperature range thereof is preferably 100° C. or higher and 500° C. or lower, and more preferably 200° C. or higher and 400° C. or lower. Although inert gas, air, steam or the like can be used for the cooling, it is preferred to use an air flow blown in a parallel or circular pattern, from the viewpoint of lowering the environmental load.

The draw speed is preferably 50 m/min or more to improve the productivity and decrease the single-yarn fineness, and is more preferably 500 m/min or more. Because the liquid crystalline polyester that was exemplified as a desirable example has a suitable yarn-drawing property at a spinning temperature, the draw speed can be set high. The upper limit thereof is not restricted and it is about 2,000 m/min from the viewpoint of the yarn-drawing property.

The spinning draft defined as a quotient calculated by dividing the discharge linear speed by the draw speed is preferably 1 or more and 500 or less, and is more preferably 10 or more and 100 or less for enhancing the yarn formation property and uniformity of fineness.

In the melt spinning, it is preferred to add an oil agent between the cooling to solidify the polymer and the take-up, from the viewpoint of improving the handling property of the fiber. Although a known oil agent can be used, it is preferred to use a common spinning oil agent or a mixed agent of the inorganic particles (A) and phosphate-based compound (B) described later, from a viewpoint of improving the unwinding when a fiber that is obtained by the melt spinning (hereinafter called original yarn of spinning) is unwound at the rewinding process before the solid-phase polymerization.

Although the take-up can be carried out by using a known winder and forming a package such as a pirn, a cheese, or a cone, a pirn winding in which a roller does not come into contact with a package surface at the time of the take-up is preferred, from the viewpoint of not giving a friction to the fibers and not fibrillating it.

The single-fiber fineness of the fiber obtained by carrying out melt spinning (before solid-phase polymerization) is preferably 18.0 dtex or less. The single-fiber fineness that is referred here is a value determined by a method described in Section B in Examples. By making the fiber thinner at a single-fiber fineness of 18.0 dtex or less, the molecular weight of the polymer is easy to increase when polymerized in solid phase at fibrous state, and the strength, elongation and elastic modulus improved. Further, because the surface area increase, the fiber has the feature of being capable of increasing the adhesion amount of inorganic particles (A) and a phosphate-based compound (B). The single-fiber fineness is more preferably 10.0 dtex or less, and still more preferably 7.0 dtex or less. Although the lower limit of the single-fiber fineness is not particularly restricted, a lower limit that can be achieved by a method of production described later is about 1.0 dtex.

The number of filaments and the total fineness of a fiber obtained by carrying out melt spinning (before solid-phase polymerization) can be freely selected. In a mesh woven fabric, for making a fiber product thinner or lighter in weight, the number of filaments is preferably 50 or less, more preferably 20 or less. In particular, because a monofilament whose number of filaments is one is for a field in which suppression of scum generation and stability of running tension are required, the liquid crystalline polyester fiber obtained by the method of production can be in particular used suitably.

Besides, the liquid crystalline polyester fiber obtained by the method of production can be used in applications of multifilament such as tension members, various stiffeners, fishing nets, ropes or the like. In this case, the total fineness of the fiber obtained by carrying out melt spinning, that is, the fiber to be subjected to solid-phase polymerization can be selected. Because if the total fineness is excessively small, fusion bonding between yarns is easy to occur at the time of solid-phase polymerization, which cause defects upon unwinding and deteriorates process passability, the total fineness is preferably 5 dtex or more, more preferably 20 dtex or more and still more preferably 100 dtex or more. The total fineness is a value determined by a method described in Section B in Examples. Further, if the total fineness is excessively large, difference is formed between the inside and outside of the yarn at the time of solid-phase polymerization, which readily causes single yarn breakage and deteriorates process passability. Therefore, the total fineness is preferably 10,000 dtex or less, more preferably 2,000 dtex or less. Furthermore, when the fiber is used in applications of multifilament, the number of single yarns contained in a yarn, that is, the number of filaments is preferably 2 or more, more preferably 5 or more, still more preferably 50 or more, and in particular preferably 100 or more. By making the number of filaments large, the total fineness can be made large even when the single fiber fineness is small. The fiber has both flexibility and high tenacity (product of strength and total fineness) of the yarn and thereby is excellent in process passability. Because an excessively large number of filaments lead to poor ease of handling, the upper limit thereof is about 5,000.

To prevent yarn breakage in a rewinding step before solid-phase polymerization which is the next step and to improve process passability, the strength of fiber obtained by carrying out melt spinning is preferably 3.0 cN/dtex or more, and more preferably 5.0 cN/dtex or more. The upper limit of the strength is about 10 cN/dtex.

To prevent yarn breakage in a rewinding step before solid-phase polymerization which is the next step and to improve process passability, the elongation of fiber obtained by carrying out melt spinning is preferably 0.5% or more, and more preferably 1.0% or more. The upper limit of the elongation is 5.0%.

To prevent yarn breakage in a rewinding step before solid-phase polymerization which is the next step and to improve process passability, the elastic modulus of fiber obtained by carrying out melt spinning is preferably 300 cN/dtex or more, and more preferably 500 cN/dtex or more. The upper limit of the elastic modulus is 800 cN/dtex.

The strength, elongation, and elastic modulus are values determined by a method described in Section C in Examples.

The liquid crystalline polyester fiber obtained by carrying out melt spinning is subjected to solid-phase polymerization after applying inorganic particles (A) and a phosphate-based compound (B). The application of the inorganic particles (A) and phosphate-based compound (B) produce effects of suppressing fusion bonding between fibers generated in the solid-phase polymerization process. In addition, as the components undergo thermal denaturation in the solid-phase polymerization step by mechanisms described later, a liquid crystalline polyester fiber in which these (A) and (B) components are readily remove from the fiber in a subsequent cleaning step is obtained. Further, the fiber obtained by carrying out the cleaning has a small amount of residues of the solid-phase polymerization oil agent on the fiber and thus generation of scum and fluctuation of running tension are suppressed, thereby leading to good weavability.

The inorganic particles (A) include known inorganic particles. Examples thereof include minerals, metal hydroxides such as magnesium hydroxide, metal oxides such as silica or alumina, carbonates such as calcium carbonate or barium carbonate, sulfates such as calcium sulfate or barium sulfate, and silicates. Besides, carbon black and the like are included. Application of such inorganic particles with high thermal resistance onto the fiber reduces a contact area between single yarns and allows fusion bonding generated at the time of the solid-phase polymerization to be avoided.

The inorganic particles (A) are preferably easy to be handled in the light of the application step and easy to disperse in water from the viewpoint of reducing environmental load and are desirably inactive under conditions for solid-phase polymerization. From these viewpoints, it is preferred to use silica or silicates. In silicates, phyllosilicates having layered structure is in particular preferred. Examples of phyllosilicates include kaolinite, halloysite, serpentine, garnierite, smectite group, pyrophyllite, talc, and mica. Of these, it is most preferred to use talc or mica in the light of a fact that talc or mica is readily available.

Further, the median diameter (D50) of the inorganic particle (A) is preferably 10 μm or less. That is because, with D50 being 10 μm or less, a probability of inorganic of the particle (A) being retained between fibers and an effect of suppressing fusion bonding becomes prominent. For the same reason, D50 is more preferably 5 μm or less. Further, the lower limit of D50 is preferably 0.01 μm or more in terms of cost and in the light of cleaning properties in the cleaning step after the solid-phase polymerization. The median diameter (D50) that is referred here is a value measured by a method described in Section G in Examples.

Further, as the phosphate-based compound (B), a compound represented by (1) to (3) in the following chemical formula can be used:

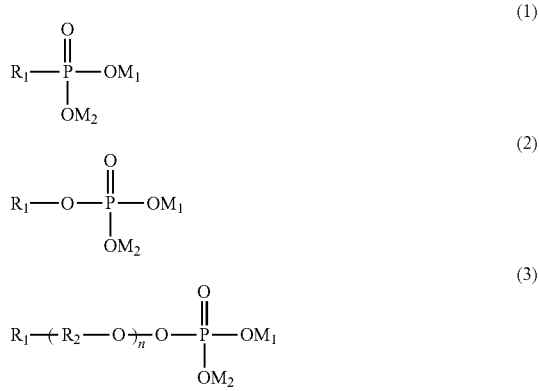

wherein, $R_1$ and $R_2$ represents a hydrocarbon group; $M_1$ represents alkali metal; and $M_2$ represents a group selected from alkali metal, hydrogen atom, hydrocarbon group, and hydrocarbon group containing oxygen atoms.

Note that n represents an integer of 1 or more. The upper limit of n is preferably 100 or less from the viewpoint of suppressing thermal decomposition, and is more preferably 10 or less.

$R_1$ preferably does not contain phenyl groups in the structure thereof in consideration of gas generated by thermal decomposition at the time of solid-phase polymerization and from the viewpoint of reducing environmental load, and is more preferably composed of alkyl groups. The number of carbon atoms in $R_1$ is preferably 2 or more from the viewpoint of affinity to the fiber surface, and preferably 20 or less from the viewpoint of limiting weight reducing rate by decomposition of organic components associated with the solid-phase polymerization and of preventing carbides produced by decomposition at the time of the solid-phase polymerization from remaining on the fiber surface.

Further, $R_2$ is a hydrocarbon having 5 carbon atoms or less from the viewpoint of solubility in water, and more preferably a hydrocarbon having 2 or 3 carbon atoms.

$M_1$ is preferably sodium or potassium from the viewpoint of production cost.

Use of the phosphate-based compound(B) in conjunction with the inorganic particle (A) not only enhances the dispersion property of the inorganic particle (A), enables uniform application onto the fiber, produce an excellent effect of suppressing fusion bonding, but also can suppress firm adhesion of the inorganic particle (A) onto the fiber surface. Therefore, the amount of the inorganic particle (A) remaining on the fiber after the cleaning decreases and an effect of suppressing scum generation in a subsequent processing step is developed. In addition, we found that a condensation salt of phosphates is formed by dehydration reaction and decomposition of organic components contained in the phosphate-based compound (B) under conditions of the solid-phase polymerization and the phosphate-based compound (B) can be readily removed using water in the cleaning step after the solid-phase polymerization due to this formation of the condensation salt. Meanwhile, we confirmed that, when the phosphate-based compound (B) was solely applied, because of deliquescent property of the condensation salt, the phosphates on the fiber surface showed moisture absorption and deliquescence to become viscous even in common storage conditions of fibers, thereby deteriorating the cleaning property. That is, we found that an excellent cleaning property is not developed until the inorganic particle (A) and phosphate-based compound (B) are combined to use. As mechanisms whereby this excellent cleaning property is developed, it is presumed that the use of the inorganic particle (A) in combination prevents the natural moisture absorption and deliquescence of the condensation salt of the phosphate-based compound (B) because the inorganic particle (A) has moisture absorbency, and the condensation salt of the phosphate-based compound (B) absorbs water to swell only when passing in water and peels to fall off from the fiber surface in a form of layers together with the inorganic particle (A).

For uniform application of the inorganic particle (A) and phosphate-based compound (B) while controlling the adhesion amount thereof to be appropriate, it is preferred to use a mixed oil agent with the inorganic particle (A) being added for a dilution solution of the phosphate-based compound (B). From the viewpoint of safety, it is preferred to use water is preferably used as a solution for dilution. From the viewpoint of suppressing fusion bonding, the concentration of the inorganic particle (A) in the dilution solution is preferably 0.01 wt % or more and more preferably 0.1 wt % or more. The upper limit thereof is preferably 10 wt % or less from the viewpoint of uniform dispersion and more preferably 5 wt % or less. Further, the concentration of the phosphate-based compound (B) is preferably 0.1 wt % or more from the viewpoint of uniform dispersion of the inorganic particle (A) and more preferably 1.0 wt % or more. The upper limit of the concentration of the phosphate-based compound (B) is not particularly restricted, and, for the purpose of avoiding excessive adhesion by increase in the viscosity of the mixed oil agent and spotty adhesion by increase in temperature dependency of the viscosity, is preferably 50 wt % or less and more preferably 30 wt % or less.

Further, as a method of applying the inorganic particle (A) and phosphate-based compound (B) to the fiber, the application may be carried out between melt spinning and winding. Yet, to enhance an adhesion efficiency, it is preferred that the application be carried out to yarns while winding back the yarns taken up by melt spinning, or a small amount be adhered in melt spinning, after which additional application is carried out while winding back the yarns taken up.

Although the method of oil adhesion may be a method of supplying oil by a guide, to apply oil to uniformly adhere to a fiber with a small total fineness such as a monofilament, adhesion by a kiss roller (oiling roller) made of a metal or a ceramic is preferred. When the fiber is in a state of a hank or a tow, it can be immersed into an oil mixture agent for application.

When the adhesion rate of the inorganic particle (A) to the fiber is designated as (a) wt %, and the adhesion rate of the phosphate-based compound (B) is designated as (b) wt %, it is preferred that both satisfy the following conditions:

$$30 \geq a+b \geq 2.0 \quad \text{Condition 1}$$

$$a \geq 0.05 \quad \text{Condition 2}$$

$$b/a \geq 1. \quad \text{Condition 3}$$

In condition 1, because the higher the oil adhesion rate of solid-phase polymerization oil agent (a+b) the more fusion bonding can be suppressed, it is preferably 2.0 wt % or more. On the other hand, because excessive oil agent makes the fiber sticky to deteriorate ease of handing, it is preferably 30 wt % or less. It is more preferred to be 4.0 wt % or more and 20 wt % or less. The oil adhesion rate (a+b) of the solid-phase polymerization oil agent to the fiber refers to a value of an oil adhesion rate determined for a fiber after the application of the solid-phase polymerization oil agent by a method described in Section D in Examples.

When an oil agent other than the solid-phase polymerization oil agent is applied to the fiber before the solid-phase polymerization oil agent is applied on fiber, an oil adhesion rate $D_1$ is determined for a fiber before the application of the solid-phase polymerization oil agent by a method described in Section D in Examples, an oil adhesion rate $D_2$ is determined for a fiber after the application of the solid-phase polymerization oil agent by a method described in Section D in Examples, and a difference between these $D_2-D_1$ is designated as the oil adhesion rate (a+b) of the solid-phase polymerization oil agent.

In condition 2, by setting the adhesion rate of the inorganic particle (A) (a) to 0.05 wt % or more, an effect of suppressing fusion bonding by the inorganic particle become prominent. The upper limit of the adhesion rate (a) is, as rough indication, 5 wt % or less from the viewpoint of uniform adhesion.

In condition 3, the adhesion rate of phosphate-based compound (B) (b) is preferably higher than the adhesion rate of the inorganic particle (A) (a) because an excellent cleaning property of the phosphate-based compound (B), which is ascribed to condensation salt formation at time of the solid-phase polymerization, becomes more prominent and also from the viewpoint of suppressing firm adhesion between the inorganic particle (A) and fiber.

The adhesion rate of the inorganic particle (A) (a) and adhesion rate of phosphate-based compound (B) (b) that are referred here means values calculated by the equation below:

$$\text{Adhesion rate of the inorganic particle } (A)(a) = (a+b) \times Ca \div (Ca+Cb).$$

$$\text{Adhesion rate of phosphate-based compound } (B)(b) = (a+b) \times Cb \div (Ca+Cb)$$

wherein, Ca refers to the concentration of the inorganic particle (A) in the solid-phase polymerization oil agent (wt %) and Cb refers to the concentration of the phosphate-based compound (B) in the solid-phase polymerization oil agent (wt %).

The solid-phase polymerization is carried out after applying the inorganic particles (A) and phosphate-based compound (B). By carrying out the solid-phase polymerization, the molecular weight increases and in turn the strength, elastic modulus and elongation thereby increase. The solid-phase polymerization can be processed at a state of a hank or a tow (for example, carried out on a metal net or the like), or can be processed at a yarn state continuously between rollers, and it is preferably carried out at a package state, where the fibers are taken up into a core material, from the viewpoint of simplifying facilities and improving productivity.

When the solid phase polymerization is carried out at a package state, the winding density is preferably 0.01 g/cc or more for preventing of collapses of the winding form; and the winding density is preferably 1.00 g/cc or less and more preferably 0.80 g/cc for avoiding fusion bonding. The winding density is a value calculated by Wf/Vf from an occupation volume of the package Vf (cc) which is determined from the outer dimension of the package and the dimension of the bobbin that becomes a core material, and a weight of fiber Wf (g). Further, because the winding form of the package collapses if the winding density is excessively small, the winding density is preferably 0.03 g/cc or more. The occupation volume Vf is a value determined by actually measuring the outer dimension of the package, and the Wf is a value calculated from the fiber fineness and the winding length.

Formation by taking up in melt spinning of the package with such a small winding density is desirable because the productivity for apparatus and the efficiency of production can be improved, and on the other hand, formation by rewinding from the package wound in melt spinning is preferable because the winding tension can be made small and the winding density can be made smaller. In rewinding, the winding density can be made smaller as the winding tension is made smaller, the winding tension is preferably 0.30 cN/dtex or less and more preferably 0.20 cN/dtex or less. Although the lower limit is not particularly restricted, a lower limit that can be achieved is about 0.01 cN/dtex.

To lower the winding density, the rewinding speed is preferably set at 500 m/min or less, and more preferably 400 m/min or less. On the other hand, a higher rewinding speed is advantageous from the viewpoint of productivity, and it is preferably set at 50 m/min or more, and, in particular, 100 m/min or more.

To form a stable package even in a low-tension, the form of winding is preferably a taper-end winding provided with tapers at both ends. In this case, the taper angle is preferably 60° or less, and more preferably 45° or less. Further, when the taper angle is small, the fiber package cannot be made larger; and in cases where a long fiber is required, the taper angle is preferably 1° or more, and more preferably 5° or more. The taper angle is defined by the following equation:

$$\theta = \tan^{-1}\left(\frac{2d}{1i-1o}\right)$$

θ: taper angle (°); d: winding thickness (mm); $l_i$: stroke of the innermost layer (mm); $l_o$: stroke of the outermost layer (mm).

Further, although a smaller number of winding in the formation of package is advantageous for avoiding fusion bonding because the contact area between fibers is smaller, it is possible to decrease a traverse failure or a swelling of package, and to make a package form better as the number of winding becomes higher. From these points, the number of winding is preferably 2 or more and 20 or less, and more preferably 5 or more and 15 or less. The number of winding that is referred here is the number of times of rotation of a spindle during half reciprocation of a traverse, and defined as a product of a time for the half reciprocation of a traverse (minute) and a rotational speed of a spindle (rpm). The higher number of winding indicates the smaller traverse angle.

The bobbin used to form the fiber package may be any type bobbin as long as it has a cylindrical shape, and it is attached to a winder when wound back as the fiber package, and the fibers are taken up to form a package by rotating it. In a solid-phase polymerization, although the fiber package can be treated integrally with the bobbin, the treatment can also be carried out at a condition where only the bobbin is taken out from the fiber package. When the treatment is carried out at a condition where the fibers are wound on the bobbin, the bobbin needs to resist the temperature of the solid-phase polymerization and, therefore, it is preferably made from a metal such as aluminum, brass, iron or stainless steel. Further, in this case, it is preferred that many holes are opened on the bobbin because a by-product of polymerization can be quickly removed and the solid-phase polymerization can be carried out efficiently. Further, when the treatment is carried out at a condition where the bobbin is taken out from the fiber package, it is preferred to attach an outer skin onto the outer layer of the bobbin. Further, in any of both cases, it is preferred that a cushion material be wound around the outer layer of the bobbin and that the liquid crystalline polyester melt spun fibers be taken up onto it, from the viewpoint of preventing fusion bonding between fibers in the innermost layer of the package and the outer layer of the bobbin. The kind of the cushion material is preferably a felt made of an organic fiber or metal fiber, and the thickness thereof is preferably 0.1 mm or more and 20 mm or less. The above-mentioned outer skin can also be substituted with the cushion material.

The fiber weight of the fiber package may be any weight, preferably 0.1 kg or more and 20 kg or less in light of productivity. As for the yarn length, a preferred range is 10,000 m or more and 2,000,000 m or less.

Although it is possible to carry out solid-phase polymerization in an inert gas atmosphere, in an activated gas atmosphere containing oxygen such as air, or under a reduced pressure condition, it is preferably carried out in a nitrogen atmosphere from the viewpoint of simplifying facilities and preventing oxidation of fibers or core materials. In this case, the atmosphere for the solid-phase polymerization is preferably a low-humidity gas having a dew point of −40° C. or lower.

The maximum temperature of solid-phase polymerization temperature is preferably $Tm_1-60°$ C., where $Tm_1$ (° C.) is defined as an endothermic peak temperature of the liquid crystalline polyester fibers to be subjected to solid-phase polymerization. Such a high temperature around the melting point makes it possible for the solid-phase polymerization to progress immediately, thereby improving the fiber strength. $Tm_1$ that is referred here is generally the melting point of a liquid crystalline polyester fiber, and it refers a value obtained by a measurement method described in Section E in Example. The maximum temperature is preferably less than $Tm_1$ (° C.) for preventing fusion bonding. Further, it is more preferred that the solid-phase polymerization temperature be enhanced gradually or continuously as time goes by, which can prevent the fusion bonding and concurrently improve the time efficiency of the solid-phase polymerization. In this case, because the melting point of the liquid crystalline polyester fibers increases as the solid-phase polymerization progressed, the solid-phase polymerization temperature can be increased to around $Tm_1$ of the liquid crystalline polyester fibers before the solid-phase polymerization+100° C. However, also in this case, the maximum temperature during solid-phase polymerization is preferably $Tm_1$ of the fibers which have been polymerized in solid phase −60 (° C.) or more and less than $Tm_1$ (° C.), from a viewpoint of enhancement of the solid-phase polymerization speed and prevention of the fusion bonding.

With respect to the time for solid phase polymerization, to sufficiently increase the melting point of the fiber, that is, the strength, elastic modulus and elongation, the time at a maximum reaching temperature is preferably 5 hours or more, and more preferably 10 hours or more. On the other hand, because effects of increased strength, elastic modulus and elongation is saturated as the time passes, to improve the productivity, the time for solid phase polymerization is preferably about 50 or less.

In the liquid crystalline polyester fiber obtained by the method of production, the solid-phase polymerization oil agent can be readily removed by cleaning. Because a fiber after the cleaning does not have gelled products or solids derived from organic components on the fiber, an amount of deposit generated is low in the weaving step and running tension fluctuation is drastically improved. Therefore, process stability and product yield in the weaving can be drastically improved. That is, the liquid crystalline polyester fiber obtained by the method of production has a small amount of deposit (scum) in the weaving step, exhibits small fluctuation of running tension and is excellent in process passability. Thus, it is suitable as fiber capable of providing a liquid crystalline polyester fiber with drastically improved product yield of woven fabric. The liquid crystalline polyester fiber that, as seen above, has a small amount of deposit (scum) in the weaving step, exhibits small fluctuation of running tension and is excellent in process passability can be in particular suitably used in mesh woven fabrics like filters for carrying out weaving or screen gauzes.

Further, the liquid crystalline polyester fiber obtained by the method of production can be expanded to applications other than mesh woven fabrics like filters for carrying out weaving or screen gauzes. Although it depends on the type of the applications, the liquid crystalline polyester fiber obtained by the method of production can be utilized without carrying out the cleaning. For example, a fiber obtained in a processing step of multifilament application is excellent in processability because it is coated with salts and particles which are powders on the fiber surface, which decreases running resistance by an action of powder mold releasing and can prevent fibrillation by scratch of the fiber, thereby enhancing running stability. In addition, that is because both can be readily cleaned and removed by water and thus a state of adhered substances being substantially absence on the fiber surface by cleaning with water when the fiber is made to a product is generated, which enhances adhesion property with chemical solution or resins.

As mentioned above, the liquid crystalline polyester fiber obtained by the method of production can be widely used in the field such as materials for general industry, materials for civil engineering and construction, use in sports, clothing for protection, materials for reinforcement of rubbers, electric materials (in particular, as tension members), acoustic materials, general clothing, or the like. Examples of effective applications include screen gauzes, filters, ropes, nets, fishing nets, computer ribbons, base fabrics for printed boards, canvases for paper machines, air bags, airships, base fabrics for domes, rider suits, fishing lines, various lines (lines for yachts, paragliders, balloons, kite yarns), blind cords, support cords for screens, various cords in automobiles or air planes, and power transmission cords for electric equipments or robots. Examples of particularly effective applications include monofilaments used in woven fabrics for industrial materials. Of these, it can be suitably used as screen gauzes for printing or mesh woven fabrics for filters that strongly require high strength, high elastic modulus and higher fineness, and also require suppression of tension fluctuation by generation of deposits in the steps for improving the weavability and quality of fabric.

From the viewpoint of improving process passability and product yield in the weaving step, it is preferred that cleaning be carried out after carrying out the solid-phase polymerization. Removal of the solid-phase polymerization oil agent for fusion bonding prevention by carrying out the cleaning allows deterioration of process passability due to accumulation of the solid-phase polymerization oil agent on a guide or the like in subsequent steps including, for example, the weaving step, generation of defects due to contamination of the accumulated substance into a product, or the like to be suppressed.

Examples of a method of cleaning include a method of wiping on the fiber surface bay a cloth of paper. Yet, because fibrillation takes place when mechanical load is applied to the solid-phase polymerization yarn, a method of immersing the fiber in a liquid in which the solid-phase polymerization oil agent can be dissolved or dispersed. In addition to the method of immersing in the liquid, a method of blowing off using a fluid is more preferred because the solid-phase polymerization oil agent swollen by the liquid can be efficiently removed.

The liquid used in the cleaning is preferably water for reducing environmental load. The higher the temperature of the liquid is, the higher the removal efficiency can be and the temperature of the liquid is preferably 30° C. or higher and more preferably 40° C. or higher. Yet, because the liquid significantly evaporate when the temperature is too high, it is preferably the boiling point of the liquid −20° C. or lower and more preferably the boiling point −30° C. or lower.

It is preferred to add a surfactant to the liquid used in the cleaning from the viewpoint improving cleaning efficiency. The amount of surfactant added is preferably 0.01 to 1 wt % for enhancing the removal efficiency and reducing the environmental load and more preferably 0.1 to 0.5 wt %.

Further, to enhance cleaning efficiency, it is preferred to impart vibration or liquid current to the liquid used in the cleaning. In this instance, although there are methods such as ultrasonic vibration of the liquid, it is preferred to impart liquid current from the viewpoint of simplifying facilities and saving energy. Examples of methods of imparting liquid current include a method of stirring inside a liquid bath, and a method of imparting liquid current using a nozzle. It is preferred to impart liquid current using a nozzle because it can be readily carried out by supplying the liquid current circulating in the liquid bath using the nozzle.

A degree of removal of the solid-phase polymerization oil agent by the cleaning is adjusted as appropriate in accordance with purpose. From the viewpoint of improving process passability of fibers in a higher-order processing step and weaving step and of improving the quality of woven fabrics, the oil adhesion rate of solid-phase polymerization oil agent remaining on the fiber after the cleaning is preferably 2.0 wt % or less, more preferably 1.0 wt % or less, and still more preferably 0.5 wt % or less. The adhesion rate of solid-phase polymerization oil agent refers to a value determined for a fiber wound back immediately after the cleaning step by a method described Section D in Examples.

In the cleaning, the fiber may be immersed in liquid at a hank, tow or package condition to increase an amount of throughput per unit time. The fiber is preferably immersed in the liquid while being run continuously to achieve uniform removal along a fiber lengthwise direction. A method of immersing the fiber continuously may be a method of introducing the fiber into a bath using a guide or the like. It is preferred that slits be provided at both sides of the bath so that the fiber can pass through those slits in the bath, without providing any yarn path guide inside the bath to suppress the fibrillation of the solid-phase polymerization fiber derived from the contact resistance to the guide.

When the solid-phase polymerized yarn in a form of package is forced to run continuously, the fiber is unwound. To suppress fibrillation at the time of delamination of a little fusion bonding, it is preferred to unwind the yarn in a direction (fiber rounding direction) perpendicular to a rotation axis by so-called lateral unwinding, as rotating the package which has been polymerized in a solid phase.

Examples of such a method of unwinding include a method of positively driving at a constant rotation speed using a motor or the like, a method of speed-regulating unwinding with the rotation speed being controlled using a dancer roller and a method of subjecting the solid-phase polymerized package to a free roll and unwinding as pulling the fiber by a speed-regulating roller. Further, a method of immersing the liquid crystalline ester fiber in a liquid in a form of package and unwinding as is a preferred mode because oil contents can be efficiently removed.

The fluid used in blowing off with a fluid is preferably air or water. In particular, when air is used for the fluid, it can be expected to exert an effect of drying the surface of the liquid crystalline polyester fiber, which prevents accumulation of pollution in subsequent steps, and potentially improve yield, and thus air is a preferred mode.

Further, because liquid used in the cleaning remains on the surface of the liquid crystalline polyester fiber after the cleaning, rinsing is a preferred mode as well. If the liquid used in the cleaning remains on the surface of the liquid crystalline polyester fiber, it ultimately dries and becomes an extraneous material on the yarn surface. The rinsing allows the surface of the liquid crystalline polyester fiber to be more uniform and can suppress fluctuation of unwinding tension ascribed to accumulation of foreign matters in subsequent steps.

The fluid used in the rinsing is preferably water. The rinsing is carried out for the purpose of removing cleaning solution components adhered onto the surface of the liquid crystalline polyester fiber. Thus, by using water which is capable of dissolving such components, the cleaning can be efficiently carried out. Further, for the purpose of increase the solubility of those components, warming water is a preferred mode as well. Because the solubility increases as the temperature increases and the efficiency of rinsing is expected to go up, the upper limit of the warming temperature is not particularly restricted. The warming temperature may be 80° C. as a rough target in the light of controlling energy consumption required for the warming to reduce energy cost and of loss by evaporation.

Addition of combinational removal of moisture remaining on the surface of the liquid crystalline polyester fiber by the blowing off after carrying out the rinsing makes the mode more preferred.

Further, it is preferred to apply a finishing oil agent form the viewpoint of improving process passability in subsequent steps after the cleaning. As the finishing oil agent, a finishing oil agent that is commonly used for polyester fibers can be preferably employed. It is more preferred not to contain particles from the viewpoint of suppressing fluctuation of running tension caused by dropping off during the step.

The oil adhesion rate of the finishing oil agent is preferably 0.1 wt % or more for the fiber to exert effects such as lubricity by finishing oil agent, and is preferably 3.0% or less for the purpose of preventing pollution by excessive addition in post processing steps. The oil adhesion rate of the finishing oil agent that is referred here is a value obtained by subtracting a value of oil adhesion of the solid-phase polymerization oil agent remaining on the fiber from a value of oil adhesion rate determined for a fiber after being added with the finishing oil agent by a method described in Section D in Examples.

Further, when improvement of abrasion resistance is required for intended use of the liquid crystalline polyester fiber such as screen gauze or monofilament for filters, it is preferred to carry out a high temperature heat treatment at a temperature of $Tm_1+10°$ C. or more after the cleaning. $Tm_1$ that is referred here indicates a value determined by a measurement method described in Section E in Examples. $Tm_1$ is the melting point of fiber. By subjecting the liquid crystalline polyester fiber to a heat treatment at a temperature that is as high as the melting point +10° C. or more, a half width of peak at $Tm_1$ is 15° C. or more, and the degree of crystallization and integrity of crystal of the whole fiber decrease, thereby markedly improve the abrasion resistance.

In respect of heat treatment, although there is a solid-phase polymerization of a liquid crystalline polyester fiber, unless the treatment temperature in this case is set at a temperature lower than the melting point of the fiber, the fibers are fused and broken by being molten. In solid-phase polymerization, although a final temperature of the solid-phase polymerization may increase up to a temperature higher than the melting point of the fibers before the treatment because the melting point of the fiber increases accompanying with the treatment, even in such a case, the treatment temperature is lower than the melting point of the fibers being treated, that is, the melting point of the fibers after the heat treatment. That is, the high-temperature heat treatment that is referred here increases the abrasion resistance by decreasing a structural difference between a dense crystal portion formed by a solid-phase polymerization and an amorphous portion, that is, by decreasing the degree of crystallization and the integrity of crystal, without carrying out a solid-phase polymerization.

Therefore, even if $Tm_1$ varies by the heat treatment, the temperature is preferably set at a temperature of $Tm_1$ of the fibers after the treatment +10° C. or higher, more preferably at a temperature of the $Tm_1+40°$ C. or higher, still more preferably at a temperature of the $Tm_1+60°$ C. or higher, and in particular preferably at a temperature of the $Tm_1+80°$ C. or higher. The upper limit of the heat treatment temperature is a temperature at which the fibers melt down and is, it varies depending on tension, speed, single-fiber fineness, treatment length., about $Tm_1+300°$ C., although.

Further, as another heat treatment, there is a heat stretching of a liquid crystal polyester fiber, but the heat stretching is a process tensing the fibers at a high temperature, the orientation of molecular chain in the fiber structure becomes high, the strength and the elastic modulus increase, and the degree of crystallization and the integrity of crystal are maintained as they are, that is, $\Delta Hm_1$ is maintained to be high and the half width of the peak $Tm_1$ is maintained to be small. Therefore, it becomes a fiber structure being inferior in abrasion resistance, and the treatment is different from the heat treatment that aims to increase the abrasion resistance by decreasing the degree of crystallization (decreasing $\Delta Hm_1$) and decreasing the integrity of crystal (increasing the half width of the peak). Because the degree of crystallization decreases in the high temperature heat treatment, the strength and elastic modulus do not increase.

It is preferred that the high-temperature heat treatment be carried out as running the fibers continuously, because the fusion bonding between fibers can be prevented and the uniformity of the treatment can be enhanced. At that time, it is preferred that a non-contact heat treatment be carried out to prevent generating the fibrils and achieve uniform treatment. As a means of heating, there are a heating of the atmosphere, a radiation heating with a laser or an infrared ray or the like. A heating by a slit heater with a block or a plate heater because it has both advantages of the atmosphere heating and radiation heating and it can enhance the stability for the treatment.

The treatment time is preferably longer from a viewpoint of decreasing the degree of crystallinity and the integrity of crystal, and is specifically preferably 0.01 seconds or longer, more preferably 0.05 seconds or longer, and still more preferably 0.1 seconds or longer. Further, the upper limit of the treatment time is preferably 5.0 seconds or less, more preferably 3.0 seconds or less, and still more preferably 2.0 seconds or less, from a viewpoint that the facility load should be reduced and that the treatment time should be shortened so that the orientation of the molecular chain is prevented from relaxing to decrease the strength and elastic modulus.

If the tension of the fiber being treated is excessively high, a melt breakage is likely to occur, and when the heat treatment is carried out at a condition of being applied with an excessive tension, because a decrease of the degree of crystallization is small and the advantage of improving the abrasion resistance becomes low, it is preferred to control the tension as low as possible. In this point, it is explicitly different from a heat stretching. However, if the tension is too low, the running of the fibers becomes unstable and the treatment becomes nonuniform and, therefore, it is preferably 0.001 cN/dtex or more and 1.0 cN/dtex or less, more preferably 0.1 cN/dtex or more and 0.3 cN/dtex or less.

Further, when a high-temperature heat treatment is carried out while running, the tension is preferably as low as possible; and stretching and relaxation may be added as appropriate. However, if the tension is too low, the running of the fibers becomes unstable and the treatment becomes nonuniform and, therefore, the relaxation rate is preferably 2% or less (0.98 times or higher as the draw ratio). Further, if the tension is too high, a melt breakage due to heat is likely to occur, and when the heat treatment is carried out at a condition of being applied with an excessive tension, because the decrease of the degree of crystallization is small and the effect of improving the abrasion resistance becomes low, the stretching ratio is preferably less than 10% (1.10 times as the draw ratio), although it depends on the temperature of the heat treatment. It is more preferably less than 5% (1.05 times as the draw ratio), still more preferably less than 3% (1.03 times). The draw ratio is defined as a quotient obtained by dividing the second roller speed by the first roller speed when the heat treatment is performed between the rollers (between the first roller and the second roller).

As the treatment speed becomes greater, a high-temperature short-time treatment becomes possible and the effect of improving the abrasion resistance increases, and even the productivity improves. Therefore, although depending upon the treatment length, the treatment speed is preferably 100 m/min or more, more preferably 200 m/min or more, still more preferably 300 m/min or more. The upper limit of the treatment speed is about 1,000 m/min from a viewpoint of the running stability of the fiber.

With respect to the treatment length, although depending upon the heating method, in the case of non-contact heating, to carry out a uniform treatment, it is preferably 100 mm or more, more preferably 200 mm or more, still more preferably 500 mm or more. Further, because, if the treatment length is excessively long, a treatment irregularity and melt breakage of fibers occur ascribed to yarn swinging in the heater, it is preferably 3,000 mm or less, more preferably 2,000 mm or less, and still more preferably 1,000 mm or less.

EXAMPLES

By way of examples, our fibers and methods will now be more specifically described below. Each of the characteristic values was determined by the following methods.

A. Running Tension Fluctuation Range (R)

A washer tensor Y-601L manufactured by Yuasa Yarn Guide Engineering Co., Ltd. was used with a scale of a dial being set to 0 (at that time, two pipe guides were lined up to be perpendicular to a fiber running direction). A liquid crystalline polyester fiber was forced to run onto the outer side of either one of two pipe guides. Two washers (TW-3) were inserted in the pipe guide where the fiber is forced to run such that the fiber was forced to run therebetween (an angle formed by the running yarn was about 90°) at a speed of 30 m/min. The tension of running yarn was continuously measured at a position of 5 to 10 cm downstream from the tensor by P/C compatible tension meter manufactured by Intec Co., Ltd. (model: IT-NR) for 10 minutes and data was collected with Damping-timer of EEPROM being set to 3 in attached Tension Star V1.14. Of the continuous data obtained during the 10 minutes, from the maximum value ($F_{max}$) and minimum value ($F_{min}$), the running tension fluctuation range (R) was calculated by the following equation:

(Running tension fluctuation range (R))=$F_{max}-F_{min}$.

B. Total Fineness and Fineness of Single Fiber

The fiber was taken by 10 m as a hank by a sizing reel, the weight (g) thereof was multiplied at 1,000 times, 10 measurements per 1 sample were carried out, and the average value was defined as the fiber fineness (dtex). A quotient calculated by dividing this with a number of filaments was defined as a fineness of single fiber (dtex).

C. Strength, Elongation, and Elastic Modulus

Based on the method described in JIS L1013 (1999), at a condition of a sample length of 100 mm and a tensile speed of 50 mm/min, 10 times measurement per one sample was carried out using Tensilon UCT-100 manufactured by Orientec Co., Ltd., and the average values were determined as a tenacity (cN), a strength (cN/dtex), an elongation (%) and elastic modulus (cN/dtex). The elastic modulus refers to an initial tensile resistance degree.

D. Amount of Oil Adhesion

Taking a fiber of 100±10 mg, the weight thereof after drying at 60° C. for 10 minutes was measured ($W_0$), the fiber was dipped in a solution prepared by adding sodium dodecylbenzene sulfonate to water of 100 times or more of the fiber weight at 2.0 wt % relative to the fiber weight, the fiber was subjected to a ultrasonic wave cleaning for 20 minutes, the fiber after the cleaning was rinsed with water, the weight after drying at 60° C. for 10 minutes was measured (W1), and the amount of oil adhesion was calculated by the following equation.

Amount of oil adhesion (wt %)=$(W_0-W_1) \times 100/W_1$.

The amount of oil adhesion of solid-phase polymerization oil agent and the amount of residual oil adhesion of solid-phase polymerization oil agent were calculated by the calculation method described above.

E. $Tm_1$ of Liquid Crystalline Polyester Fiber, Half Width of Peak at $Tm_1$, $\Delta Hm_1$, and Melting Point of Liquid Crystalline Polyester Polymer Differential calorimetry was carried out by DSC 2920 manufactured by TA Instruments Corporation, a temperature of endothermic peak observed when measured under a condition of heating from 50° C. at a temperature elevation rate of 20° C./min was referred to as $Tm_1$ (° C.), and the half width of the peak (° C.) and the heat of melting ($\Delta Hm_1$) (J/g) at $Tm_1$ were measured.

With regard to the liquid crystalline polyester polymer shown in Reference Examples, an endothermic peak observed when once cooled down to 50° C. under a condition of a temperature lowering rate of 20° C./min after maintained for five minutes at a temperature of $Tm_1+20°$ C. after observation of $Tm_1$ was referred to as Tm2, and this Tm2 was referred to as the melting point of the polymer.

F. Polystyrene Equivalent Weight Average Molecular Weight (Molecular Weight)

Using a mixed solvent of pentafluoro phenol/chloroform=35/65 (weight ratio) as the solvent, a sample for GPC measurement was prepared by dissolution so that the concentration of liquid crystalline polyester became 0.04 to 0.08 weight/volume %. When there is an insoluble substance even after allowed to stand at a room temperature for 24 hours, the sample was allowed to stand for another 24 hours, and then, a supernatant was taken as the sample. This was measured using a GPC measurement device manufactured by Waters Corporation, and the weight average molecular weight (Mw) was determined in terms of a polystyrene-equivalent weight average molecular weight.

Column: Shodex K-806M; two pieces, K-802; one piece
Detector: Differential refractive index detector RI (2414 type)

Temperature: 23±2° C.

Flow rate: 0.8 mL/min

Injection amount: 200 µL

G. Median Diameter (D50)

Measurement of particle size was carried out by a laser diffraction particle size distribution analyzer SALD-2000J manufactured by Shimadzu Corporation to determine a median diameter (D50).

H. Amount of Scum Generated

A washer tensor Y-601L manufactured by Yuasa Yarn Guide Engineering Co., Ltd. was used with a scale of a dial being set to 0 (at that time, two pipe guides were lined up to be perpendicular to a fiber running direction). A liquid crystalline polyester fiber was forced to run onto the outer side of either one of two pipe guides. Two washers (TW-3) were inserted in the pipe guide where the fiber is forced to run such that the fiber was forced to run therebetween (an angle formed by the running yarn was about 90°). A fiber of a length of 100,000 m was forced to run at a speed of 400 m/min. The washer weight of the fiber before and after the running was measured by an analytical electric balance (EP214C) manufactured by Mettler-Toledo International Inc. to calculate a value represented by the following equation. The length of fiber that was forced to run could be selected from between 25,000 m and 100,000 m. When the length of fiber was less than 100,000 m, the amount of scum generated equivalent of a fiber length of 100,000 m was proportionally calculated from the length of fiber forced to run.

Amount of scum generated (g)=(washer weight after fiber running)−(washer weight before fiber running)

I. Weavability and Fabric Characteristic Evaluation

Using a polyester monofilament as a warp yarn in a rapier weaving machine, a weft driving test of a liquid crystalline polyester fiber used as a weft yarn was carried out at a condition of weaving density of 250/inch (2.54 cm) for both of warp and weft yarns and a driving speed of 100 times/min. At that time, the process passability was determined from accumulation of scum to the yarn supply port (ceramic guide) in a test weaving at a width of 180 cm and a length of 100 cm, the weavability was determined from the times of machine stopping due to yarn breakage, and the quality of fabric was determined from the number of scum contaminated into the yarn supply port. The respective determination criteria are as follows. When the number of the times of machine stopping exceeded 15 times, the weaving was judged to be not feasible and the evaluation of the weaving was discontinued.

Process Passability

Scum is not recognized by observation even after the weaving: excellent (A)

Scum is recognized after the weaving, but fiber running is not affected: good (B)

Scum is recognized after the weaving, and fiber running tension increases: (C)

Weavability

Machine stopping 5 times or less: excellent (A); 6 to 10 times: good (B); 11 times or more: not good (C)

Quality of Fabric

The number of contaminated scum 5 or less: excellent (A); 6 to 10: good (B); 11 or more: not good (C)

J. Effect of Suppressing Fusion Bonding

The package after the solid-phase polymerization was attached to a free roll creel (which had an axis, bearings and a freely-rotatable outer layer and which had no brakes and no drive source), and therefrom a yarn was drawn out in a lateral direction (in a fiber rounding direction), and unwound at 400 m/min for 30 minutes. Thereafter, the surface of the solid-phase polymerization package was observed to evaluate an effect of suppressing fusion bonding by the following criteria based on the presence of fluff:

A: The fluff was not observed.

B: The fluff was observed at 1 to 2 sites.

C: The fluff was observed at 3 or more sites.

K. Running Stability

While being unwound, the liquid crystalline polyester fiber was rolled on a first roller with separate roller rotating at 400 m/min by 6 rounds, successively rolled on a first roller with separate roller rotating at 401 m/min by 6 rounds, and sucked by a suction gun. After this operation was carried out for 30 minutes, running stability was evaluated based on the number of times of yarn swinging in a running state for 1 minute (the number of times of the running yarn being taken by the roller) by the following criteria:

A: The yarn swing 0 times

B: The yarn swing twice or less

C: The yarn swing 3 times or more.

L. Post-processability

As for a fiber after the adhesion rate for the fiber weight was measured, the surface of 5 single fibers was observed at a visual field of 500 µm×700 µm using an optical microscope and post-processability was evaluated based on adhered substances on the fiber surface by the following criteria:

A: There are 2 or less adhered substances on the fiber surface.

B: There are 3 to 10 adhered substances on the fiber surface.

C: There are 11 or more adhered substances on the fiber surface.

Reference Example 1 p-hydroxy bezoate of 870 parts by weight, 4,4'-dihydroxy biphenyl of 327 parts by weight, hydroquinone of 89 parts by weight, terephthalic acid of 292 parts by weight, isophthalic acid of 157 parts by weight and acetic anhydride of 1,460 parts by weight (1.10 equivalent of the sum of phenolic hydroxyl group) were charged into a reaction vessel of 5 L with an agitating blade and a distillation tube. The temperature was elevated from a room temperature to 145° C. for 30 minutes while agitated under a nitrogen gas atmosphere and then those in the reaction vessel were brought into reaction at 145° C. for 2 hours. Thereafter, the temperature was elevated to 310° C. for 4 hours.

The polymerization temperature was kept at 335° C. and the pressure was reduced to 133 Pa over 1.5 hours. The reaction was further continued for 20 minutes, and at the time when the torque reached 15 kg-cm, the condensation polymerization was completed. Next, the inside of the reaction vessel was pressurized at 0.1 MPa, a polymer was discharged as a strand-like material through a die having one circular discharge port with a diameter of 10 mm, and it was pelletized by a cutter.

The composition, melting point, and molecular weight of the obtained liquid crystalline polyester are as described in Table 1.

Reference Example 2 p-hydroxy bezoate of 907 parts by weight, 6-hydroxy-2-naphthoic acid of 457 parts by weight and acetic anhydride of 946 parts by weight (1.03 mol equivalent of the sum of phenolic hydroxyl group) were charged into a reaction vessel of 5 L with an agitating blade and a distillation tube. The temperature was elevated from a room temperature to 145° C. over 30 minutes while agitated under a nitrogen gas atmosphere and then those in the reaction vessel were brought into reaction at 145° C. for 2 hours. Thereafter, the temperature was elevated to 325° C. over 4 hours.

The polymerization temperature was kept at 325° C. and the pressure was reduced to 133 Pa over 1.5 hours. The reaction was further continued for 20 minutes, and at the time when the torque reached the predetermined one, the condensation polymerization was completed. Next, the inside of the reaction vessel was pressurized at 0.1 MPa, a polymer was discharged as a strand-like material through a die having one circular discharge port with a diameter of 10 mm, and it was pelletized by a cutter.

The composition, melting point, and molecular weight of the obtained liquid crystalline polyester are as described in Table 1.

TABLE 1

| | | | Reference Example 1 | Reference Example 2 |
|---|---|---|---|---|
| p-hydroxy bezoate unit (Structural unit (I)) | | mol % | 54 | 73 |
| 4,4'-dihydroxy biphenyl unit (Structural unit (II)) | | mol % | 16 | 0 |
| Hydroquinone unit (Structural unit (III)) | | mol % | 7 | 0 |
| Terephthalic acid unit (Structural unit (IV)) | | mol % | 15 | 0 |
| Isophthalic acid unit (Structural unit (V)) | | mol % | 8 | 0 |
| 6-hydroxy-2-naphthoic acid unit | | mol % | 0 | 27 |
| Liquid crystalline polyester characteristics | Melting point | ° C. | 320 | 318 |
| | Molecular weight | | 10.4 × 10⁴ | 9.1 × 10⁴ |

Example 1

Using the liquid crystalline polyester of Reference Example 1, vacuum drying was carried out at 160° C. for 12 hours and it was then melt extruded by a single-screw extruder of Φ15 mm manufactured by Osaka Seiki Kosaku, and the polymer was supplied to a spinning pack while metered by a gear pump. In the spinning pack, the polymer was filtered using a metal nonwoven fabric filter, and the polymer was discharged from a die with ten holes. The discharged polymer was passed through a heat retaining region of 40 mm, and then cooled and solidified from the outer side of the yarn by an annular cooling air with 25° C. air flow. Thereafter, a spinning oil agent whose main component was a fatty acid ester compound was added, and all of the filaments were together wound to a first godet roller. This was passed through a second godet roller having the same speed and then all of the filaments except one filament were sucked by a suction gun, and the remaining one filament fiber was wound in a pirn form via a dancer arm using a pirn winder (EFT type take up winder manufactured by Kamitsu Seisakusho Ltd., no contact roller contacting with a wound package). During the winding, no yarn breakage occurred and the yarn formation property was good. The obtained fiber exhibited a fineness of 6.0 dtex, a strength of 6.4 cN/dtex, an elongation of 1.4%, and an elastic modulus of 495 cN/dtex.

The fibers were rewound from this spun fiber package using an SSP-MV type rewinder (contact length (winding stroke of the innermost layer) of 200 mm, the number of winding of 8.7, taper angle of 45°) manufactured by Kamitsu Seisakusho Ltd. The spun fibers are unwound in a vertical direction (in a direction perpendicular to the fiber rounding direction). Without using a speed-regulating roller, using an oiling roller (having a stainless-steel roll with pear skin-finished surface), solid-phase polymerization oil agent was fed, wherein talc with a median diameter of 1.0 μm, SG-2000 (manufactured by Nippon Talc Co., Ltd.) shown as Talc 1 in Table 2, as an inorganic particle (A), was dispersed in the amount of 1.0 wt % into aqueous solution containing 6.0 wt % phosphate-based compound ($B_1$) represented by the following chemical formula (4) as a phosphate-based compound (B):

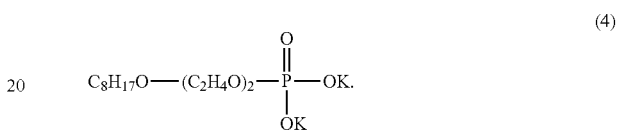

(4)

A stainless-steel bobbin with holes and wound thereon with a "Kevlar" felt (weight: 280 g/m², thickness: 1.5 mm) was used as a core member for the roll-back, and the surface pressure was set to 100 gf (98.0665 cN). The oil adhesion rate of the solid-phase polymerization oil agent onto the fiber after the roll-back (a+b) was 15 wt %.

Next, the bobbin with holes was detached from the package wound back, and solid-phase polymerization was carried out in a condition of a package where the fibers were taken up on the "Kevlar" felt. The solid-phase polymerization was carried out using a closed type oven at a condition where the temperature was elevated from a room temperature to 240° C. over about 30 minutes, kept at 240° C. for 3 hours, elevated to 290° C. at a rate of 4° C./hr and kept for 20 hours. As the atmosphere, dehumidified nitrogen was supplied at a flow rate of 20 NL/min, and it was discharged from an exhaust port not to pressurize the inside.

The obtained fiber after the solid-phase polymerization exhibited a fineness of 6.0 dtex, a strength of 24.5 cN/dtex, an elongation of 2.6%, and an elastic modulus of 1,100 cN/dtex. The strength, elongation and elastic modulus were improved as compared with those before the solid-phase polymerization and thus it could be confirmed that the solid-phase polymerization proceeded.

The fibers were unwound from the thus obtained package after the solid-phase polymerization, and subjected to successively washing for removing the solid-phase polymerization oil agent and high-temperature non-contact heat treatment.

That is, the package after the solid-phase polymerization was attached to a free roll creel (which had an axis, bearings and a freely-rotatable outer layer and which had no brakes and no drive source), and therefrom a yarn was drawn out in a lateral direction (in a fiber rounding direction), and continuously, the fibers were inserted into a bath (with no guides contacting to fibers inside), which has a length of 150 cm (contact length of 150 cm), provided with slits at both ends and the oil agent was washed and removed. A wash solution containing nonionic-anionic surfactant (Gran Up US-30 manufactured by Sanyo Chemical Industries, Ltd.) by 1.0 wt % was controlled to 50° C. in an external tank, and was supplied into a water tank by a pump. When supplied to the water tank, the wash solution was supplied into the water tank through a pipe having holes every 5 cm in the water tank to give liquid flow in the water tank by supplying through this pipe. There provided a mechanism where the wash solution, which had been overflowed from the slits and holes for adjusting liquid level, was returned to the external tank.

The fibers after the washing were continuously inserted into a bath (with no guides contacting to fibers inside) provided with slits at both ends, which bath has a length of 23 cm (contact length of 23 cm) and rinsed with 50° C. heated water. The fibers after the rinsing were passed through a bearing roller guide to blow away water by applying air flow, and then the first roller having a separate roller of 400 m/min. Because the creel is a free roll, this roller is supposed to draw fibers to unwind from the solid-phase polymerized package and to run the fibers.

The fiber that had passed through the roller was driven between slit heaters of a length of 1 m, which are heated to 510° C., to be subjected to high-temperature non-contact heat treatment. The slit heater was not provided with guides inside with no contact between the heater and the fiber. The fibers which had passed through the heater were passed through the second roller having a separate roller. Speeds are set to the same between the first roller and the second roller. The fibers that had passed through the second roller were given finishing oil having a fatty acid ester compound as a main constituent using an oiling roller made of ceramic, and was taken up by an EFT type bobbin traverse winder (manufactured by Kamitsu Seisakusho Ltd.).

The characteristics of the obtained fiber are as shown in Table 2. Because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was excellent as well.

The obtained fiber exhibited a $Tm_1$ of 339° C., a $\Delta Hm_1$ of 0.5 J/g, a half width of peak at $Tm_1$ of 31° C., and an amount of scum generated of 0.0003 g.

From the above result, the tension fluctuation was small and the scum generation was suppressed in practical warping and weaving steps as well. It would be expected to have excellent characteristics with few defects when made to a mesh woven fabric for a screen gauze for printing, a filter or the like.

Examples 2 to 6

A liquid crystalline polyester fiber was obtained in the same manner as described in Example 1 except that the rotation number of the oiling roller at the time of the winding back was altered and the oil adhesion rate of solid-phase polymerization oil agent to the fiber after the winding back (a+b) was altered as shown in Table 2.

The characteristics of the obtained fiber are as shown in Table 2. Because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was excellent as well.

The fiber that was obtained in Example 2 exhibited a $Tm_1$ of 332° C., a $\Delta Hm_1$ of 0.6 J/g, a half width of peak at $Tm_1$ of 29° C., and an amount of scum generated of 0.0005 g. The fiber that was obtained in Example 3 exhibited a $Tm_1$ of 335° C., a $\Delta Hm_1$ of 0.7 J/g, a half width of peak at $Tm_1$ of 28° C., and an amount of scum generated of 0.0007 g. The fiber that was obtained in Example 4 exhibited a $Tm_1$ of 337° C., a $\Delta Hm_1$ of 0.5 J/g, a half width of peak at $Tm_1$ of 26° C., and an amount of scum generated of 0.0005 g. The fiber that was obtained in Example 5 exhibited a $Tm_1$ of 331° C., a $\Delta Hm_1$ of 0.7 J/g, a half width of peak at $Tm_1$ of 28° C., and an amount of scum generated of 0.0004 g. The fiber that was obtained in Example 6 exhibited a $Tm_1$ of 334° C., a $\Delta Hm_1$ of 0.6 J/g, a half width of peak at $Tm_1$ of 27° C., and an amount of scum generated of 0.0006 g.

From the above result, the tension fluctuation was small and the scum generation was suppressed in practical warping and weaving steps as well. It would be expected to have excellent characteristics with few defects when made to a mesh woven fabric for a screen gauze for printing, a filter or the like.

TABLE 2

|  |  | Example 1 | Example 2 | Example 3 | Example 4 | Example 5 | Example 6 |
|---|---|---|---|---|---|---|---|
| Liquid crystalline polyesterpolymer | — | Reference Example 1 | Reference Example 1 | Reference Example 1 | Reference Example 1 | Reference Example 1 | Reference Example 1 |
| Inorganic particle (A) | — | Talc 1 | Talc 1 | Talc 1 | Talc 1 | Talc 1 | Talc 1 |
| Median diameter (D50) | μm | 1.0 | 1.0 | 1.0 | 1.0 | 1.0 | 1.0 |
| Phosphate-based compound (B) | — | Phosphate-based compound ($B_1$) | Phosphate-based compound ($B_1$) | Phosphate-based compound ($B_1$) | Phosphate-based compound ($B_1$) | Phosphate-based compound ($B_1$) | Phosphate-based compound ($B_1$) |
| Oil adhesion rate of solid-phase Polymerization oil agent (a + b) | wt % | 15 | 1.0 | 2.1 | 4.7 | 20 | 30 |
| A | wt % | 2.1 | 0.14 | 0.30 | 0.67 | 2.9 | 4.3 |
| b/a | — | 6 | 6 | 6 | 6 | 6 | 6 |
| The presence of cleaning step | — | Present | Present | Present | Present | Present | Present |
| The presence of high temperature heat treatment step | — | Present | Present | Present | Present | Present | Present |
| The number of filaments | Filaments | 1 | 1 | 1 | 1 | 1 | 1 |
| Single fiber fineness | dtex | 6.0 | 6.0 | 6.0 | 6.0 | 6.0 | 6.0 |
| Strength | cN/dtex | 17.9 | 16.9 | 17.3 | 17.7 | 17.8 | 17.9 |
| Elongation | % | 2.8 | 2.6 | 2.7 | 2.6 | 2.7 | 2.7 |
| Elastic modulus | cN/dtex | 754 | 698 | 728 | 747 | 748 | 758 |

TABLE 2-continued

|  |  | Example 1 | Example 2 | Example 3 | Example 4 | Example 5 | Example 6 |
|---|---|---|---|---|---|---|---|
| The presence of particulates in finishing oil agent | — | Absent | Absent | Absent | Absent | Absent | Absent |
| Oil adhesion rate | % | 0.9 | 1 | 1 | 1.1 | 0.9 | 1 |
| Oil adhesion rate of residual solid-phase polymerization oil agent | % | 0.1 | 0.1 | 0.2 | 0.1 | 0.1 | 0.1 |
| Oil adhesion rate of finishing oil agent | % | 0.8 | 0.9 | 0.8 | 1.0 | 0.8 | 0.9 |
| Running tension fluctuation range (R) | cN | 3.2 | 3.4 | 3.5 | 3.6 | 3.4 | 3.7 |
| Process passability | — | A | A | A | A | A | A |
| Weavability | — | A (0 times) | A (Once) | A (0 times) | A (0 times) | A (Twice) | A (Once) |
| Quality of woven fabric | — | A (0) | A (0) | A (0) | A (0) | A (0) | A (0) |

Example 7

A liquid crystalline polyester fiber was obtained in the same manner as described in Example 1 except that the number of filaments was set to 10 in the spinning step.

The characteristics of the obtained fiber are as shown in Table 3. Because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was excellent as well.

The fiber that was obtained in Example 7 exhibited a $Tm_1$ of 338° C., a $\Delta Hm_1$ of 1.3 J/g, a half width of peak at $Tm_1$ of 25° C., and an amount of scum generated of 0.0012 g.

From the above result, the tension fluctuation was small and the scum generation was suppressed in practical warping and weaving steps as well. It would be expected to have excellent characteristics with few defects when made to a mesh woven fabric for a screen gauze for printing, a filter or the like.

The fiber obtained in the spinning exhibited a fineness of 6.0 dtex, a strength of 6.1 cN/dtex, an elongation of 1.3%, and an elastic modulus of 463 cN/dtex; and the fiber after the solid-phase polymerization exhibited a fineness of 6.0 dtex, a strength of 23.6 cN/dtex, an elongation of 2.5%, and an elastic modulus of 1,058 cN/dtex. The strength, elongation and elastic modulus were improved as compared with those of the fiber before the solid-phase polymerization and thus it was confirmed that the solid-phase polymerization proceeded.

Example 8

A liquid crystalline polyester fiber was obtained in the same manner as described in Example 1 except that "SYLYSIA"310P (manufactured by Fuji Silysia Chemical Ltd.) which was silica was used as the inorganic particle (A).

The characteristics of the obtained fiber are as shown in Table 3. Because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was excellent as well.

The fiber that was obtained in Example 8 exhibited a $Tm_1$ of 337° C., a $\Delta Hm_1$ of 0.5 J/g, a half width of peak at $Tm_1$ of 28° C., and an amount of scum generated of 0.0010 g.

From the above result, the tension fluctuation was small and the scum generation was suppressed in practical warping and weaving steps as well. It would be expected to have excellent characteristics with few defects when made to a mesh woven fabric for a screen gauze for printing, a filter or the like.

Example 9

A liquid crystalline polyester fiber was obtained in the same manner as described in Example 1 except that "MICRO ACE" (registered trademark) P-2 (manufactured by Nippon Talc Co., Ltd.) which was a talc of a median diameter 7.0 μm shown as Talc 2 in Table 3 was used as the inorganic particle (A).

The characteristics of the obtained fiber are as shown in Table 3. Because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was good.

The fiber that was obtained in Example 9 exhibited a $Tm_1$ of 334° C., a $\Delta Hm_1$ of 0.6 J/g, a half width of peak at $Tm_1$ of 24° C., and an amount of scum generated of 0.0010 g.

From the above result, although there were some concerns about yarn breakage, the tension fluctuation was small and the scum generation was suppressed in practical warping and weaving steps as well. It would be expected to have excellent characteristics with few defects when made to a mesh woven fabric for a screen gauze for printing, a filter or the like.

As for factors causing slightly lower weavability than Example 1, it is presumed that, due to the large median diameter of the inorganic particle, very minor fusion bonding occurred at the time of the solid-phase polymerization of the fiber, which caused deterioration of fiber characteristics and resulted in yarn breakage at the time of weaving.

Example 10

A liquid crystalline polyester fiber was obtained in the same manner as described in Example 1 except that "TAL-CAN POWDER" (registered trademark) PK-C (manufactured by Hayashi Kasei Co., Ltd.) which was a talc of a median diameter 11 μm shown in Table 3 as Talc 3 was used as the inorganic particle (A).

The characteristics of the obtained fiber are as shown in Table 3. Because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was good.

The fiber that was obtained in Example 10 exhibited a $Tm_1$ of 334° C., a $\Delta Hm_1$ of 0.7 J/g, a half width of peak at $Tm_1$ of 28° C., and an amount of scum generated of 0.0009 g.

From the above result, although there were some concerns about yarn breakage, the tension fluctuation was small and the scum generation was suppressed in practical warping and weaving steps as well. It would be expected to have excellent characteristics with few defects when made to a mesh woven fabric for a screen gauze for printing, a filter or the like.

As for factors causing slightly lower weavability than Example 1, it is presumed that, due to the large median diameter of the inorganic particle, very minor fusion bonding occurred at the time of the solid-phase polymerization of the fiber, which caused deterioration of fiber characteristics and resulted in yarn breakage at the time of weaving.

passability and quality of woven fabric were excellent. In addition, the weavability was excellent or good as well.

The fiber that was obtained in Example 11 exhibited a $Tm_1$ of 336° C., a $\Delta Hm_1$ of 0.5 J/g, a half width of peak at $Tm_1$ of 29° C., and an amount of scum generated of 0.0012 g. The fiber that was obtained in Example 12 exhibited a $Tm_1$ of 337° C., a $\Delta Hm_1$ of 0.7 J/g, a half width of peak at $Tm_1$ of 27° C., and an amount of scum generated of 0.0007 g. The fiber that was obtained in Example 13 exhibited a $Tm_1$ of 332° C., a $\Delta Hm_1$ of 0.6 J/g, a half width of peak at $Tm_1$ of 24° C., and an amount of scum generated of 0.0007 g. The fiber that was obtained in Example 14 exhibited a $Tm_1$ of 333° C., a $\Delta Hm_1$ of 0.5 J/g, a half width of peak at $Tm_1$ of 26° C., and an amount of scum generated of 0.0011 g.

From the above result, the tension fluctuation was small and the scum generation was suppressed in practical warping and weaving steps as well. It would be expected to have excellent characteristics with few defects when made to a mesh woven fabric for a screen gauze for printing, a filter or the like.

As for factors causing slightly lower weavability than Example 1 in Example 11, it is presumed that, due to the

TABLE 3

|  |  | Example 7 | Example 8 | Example 9 | Example 10 |
|---|---|---|---|---|---|
| Liquid crystalline polyesterpolymer | — | Reference Example 1 | Reference Example 1 | Reference Example 1 | Reference Example 1 |
| Inorganic particle (A) | — | Talc 1 | Silica | Talc 2 | Talc 3 |
| Median diameter (D50) | μm | 1.0 | 2.7 | 7.0 | 11 |
| Phosphate-based compound (B) | — | Phosphate-based compound ($B_1$) | Phosphate-based compound ($B_1$) | Phosphate-based compound ($B_1$) | Phosphate-based compound ($B_1$) |
| Oil adhesion rate of solid-phase polymerization oil agent (a + b) | wt % | 15 | 15 | 15 | 15 |
| A | wt % | 2.1 | 2.1 | 2.1 | 2.1 |
| b/a | — | 6 | 6 | 6 | 6 |
| The presence of cleaning step | — | Present | Present | Present | Present |
| The presence of high temperature heat treatment step | — | Present | Present | Present | Present |
| The number of filaments | Filaments | 10 | 1 | 1 | 1 |
| Single fiber fineness | dtex | 6.0 | 6.0 | 6.0 | 6.0 |
| Strength | cN/dtex | 17.3 | 17.6 | 17.2 | 16.8 |
| Elongation | % | 2.6 | 2.7 | 2.6 | 2.4 |
| Elastic modulus | cN/dtex | 729 | 748 | 724 | 697 |
| The presence of particulates in finishing oil agent | — | Absent | Absent | Absent | Absent |
| Oil adhesion rate | % | 1.9 | 0.8 | 1 | 1.2 |
| Oil adhesion rate of residual solid phase polymerization oil agent | % | 0.2 | 0.1 | 0.1 | 0.2 |
| Oil adhesion rate of finishing oil agent | % | 1.7 | 0.7 | 0.9 | 1.0 |
| Running tension fluctuation range (R) | cN | 4.9 | 3.9 | 3.8 | 4.0 |
| Process passability | — | A | A | A | A |
| Weavability | — | A (4 times) | A (4 times) | B (6 times) | B (10 times) |
| Quality of woven fabric | — | A (3) | A (2) | A (1) | A (2) |

Examples 11 to 14

A liquid crystalline polyester fiber was obtained in the same manner as described in Example 1 except that the amount of dispersion of the inorganic particle (A) in the solid-phase polymerization oil agent and the adhesion rate (a) wt % of the inorganic particle to the fiber was altered as shown in Table 4.

The characteristics of the obtained fiber are as shown in Table 4. Because the oil adhesion rate of residual solid-phase polymerization oil agent was very low and the running tension fluctuation range (R) was small, the scum generation and tension fluctuation were suppressed and the process smaller amount of the inorganic particle (A) added, some fusion bonding occurred at the time of the solid-phase polymerization of the fiber, which caused deterioration of fiber characteristics and resulted in yarn breakage at the time of weaving.

As for factors causing slightly lower weavability than Example 1 in Example 14, it is presumed that, due to the larger amount of the inorganic particle (A) added, adhesion became spotty and some fusion bonding occurred at the time of the solid-phase polymerization of the fiber, which caused deterioration of fiber characteristics and resulted in yarn breakage at the time of weaving.

Examples 15 and 16

A liquid crystalline polyester fiber was obtained in the same manner as described in Example 1 except that the phosphate-based compound (B) was, as shown in Table 4, altered to a phosphate-based compound ($B_2$) represented by the following formula (5) or a phosphate-based compound ($B_3$) represented by the following formula (6):

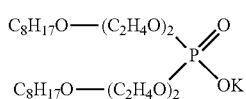

(5)

The characteristics of the obtained fiber are as shown in Table 4. Because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was excellent as well.

The fiber obtained in Example 15 exhibited a $Tm_1$ of 329° C., a $\Delta Hm_1$ of 0.5 J/g, a half width of peak at $Tm_1$ of 28° C., and an amount of scum generated of 0.0006 g. The fiber that was obtained in Example 16 exhibited a $Tm_1$ of 330° C., a $\Delta Hm_1$ of 0.6 J/g, a half width of peak at $Tm_1$ of 27° C., and an amount of scum generated of 0.0007 g.

From the above result, the tension fluctuation was small and the scum generation was suppressed in practical warping and weaving steps as well. It would be expected to have excellent characteristics with few defects when made to a mesh woven fabric for a screen gauze for printing, a filter or the like.

TABLE 4

| | | Example 11 | Example 12 | Example 13 | Example 14 | Example 15 | Example 16 |
|---|---|---|---|---|---|---|---|
| Liquid crystalline polyesterpolymer | — | Reference Example 1 | Reference Example 1 | Reference Example 1 | Reference Example 1 | Reference Example 1 | Reference Example 1 |
| Inorganic particle (A) | — | Talc 1 | Talc 1 | Talc 1 | Talc 1 | Talc 1 | Talc 1 |
| Median diameter (D50) | μm | 1.0 | 1.0 | 1.0 | 1.0 | 1.0 | 1.0 |
| Phosphate-based compound (B) | — | Phosphate-based compound ($B_1$) | Phosphate-based compound ($B_1$) | Phosphate-based compound ($B_1$) | Phosphate-based compound ($B_1$) | Phosphate-based compound ($B_2$) | Phosphate-based compound ($B_3$) |
| Oil adhesion rate of solid-phase polymerization oil agent (a + b) | wt % | 15 | 15 | 15 | 15 | 15 | 15 |
| a | wt % | 0.009 | 0.05 | 5.0 | 7.6 | 2.1 | 2.1 |
| b/a | — | 1666 | 299 | 2 | 0.97 | 6 | 6 |
| The presence of cleaning step | — | Present | Present | Present | Present | Present | Present |
| The presence of high temperature heat treatment step | — | Present | Present | Present | Present | Present | Present |
| The number of filaments | Filaments | 1 | 1 | 1 | 1 | 1 | 1 |
| Single fiber fineness | dtex | 6.0 | 6.0 | 6.0 | 6.0 | 6.0 | 6.0 |
| Strength | cN/dtex | 16.7 | 17.2 | 17.9 | 16.8 | 17.8 | 17.9 |
| Elongation | % | 2.6 | 2.7 | 2.7 | 2.7 | 2.6 | 2.7 |
| Elastic modulus | cN/dtex | 694 | 719 | 755 | 698 | 753 | 738 |
| The presence of particulates in finishing oil agent | — | Absent | Absent | Absent | Absent | Absent | Absent |
| Oil adhesion rate | % | 0.9 | 1 | 1.2 | 1.4 | 1 | 1.2 |
| Oil adhesion rate of residual solid-phase polymerization oil agent | % | 0.1 | 0.1 | 0.3 | 0.4 | 0.1 | 0.2 |
| Oil adhesion rate of finishing oil agent | % | 0.8 | 0.9 | 0.9 | 1.0 | 0.9 | 1 |
| Running tension fluctuation range (R) | cN | 3.5 | 2.4 | 3.3 | 3.4 | 3.3 | 1.5 |
| Process passability | — | A | A | A | A | A | A |
| Weavability | — | B (8 times) | A (Once) | A (Once) | B (6 times) | A (Twice) | A (Once) |
| Quality of woven fabric | — | A (0) | A (1) | A (1) | A (1) | A (0) | A (0) |

-continued

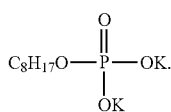

(6)

Examples 17 and 18

A liquid crystalline polyester fiber was obtained in the same manner as described in Example 1 except that the discharge amount in the spinning step was altered to change the fineness.

The characteristics of the obtained fiber are as shown in Table 5. Because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was excellent as well.

The fiber that was obtained in Example 17 exhibited a $Tm_1$ of 338° C., a $\Delta Hm_1$ of 0.5 J/g, a half width of peak at $Tm_1$ of 29° C., and an amount of scum generated of 0.0007 g. The fiber that was obtained in Example 18 exhibited a $Tm_1$ of 336° C., a $\Delta Hm_1$ of 0.7 J/g, a half width of peak at $Tm_1$ of 26° C., and an amount of scum generated of 0.0006 g.

From the above result, the tension fluctuation was small and the scum generation was suppressed in practical warping and weaving steps as well. It would be expected to have excellent characteristics with few defects when made into a mesh woven fabric for a screen gauze for printing, a filter or the like.

The fiber obtained in the spinning in Example 17 exhibited a fineness of 4.0 dtex, a strength of 5.8 cN/dtex, an elongation of 1.3%, and an elastic modulus of 460 cN/dtex; and the fiber after the solid-phase polymerization exhibited a fineness of 4.0 dtex, a strength of 21.0 cN/dtex, an elongation of 2.3%, and an elastic modulus of 1,059 cN/dtex. The strength, elongation and elastic modulus were improved as compared with those of the fiber before the solid-phase polymerization and thus it was confirmed that the solid-phase polymerization proceeded.

Further, the fiber obtained in the spinning in Example 18 exhibited a fineness of 13.0 dtex, a strength of 6.1 cN/dtex, an elongation of 1.3%, and an elastic modulus of 484 cN/dtex; and the fiber after the solid-phase polymerization exhibited a fineness of 13.0 dtex, a strength of 20.5 cN/dtex, an elongation of 2.2%, and an elastic modulus of 945 cN/dtex. The strength, elongation and elastic modulus were improved as compared to those of the fiber before the solid-phase polymerization and thus it was confirmed that the solid-phase polymerization proceeded.

Example 19

A liquid crystalline polyester fiber was obtained in the same manner as described in Example 1 except that the temperature was not increased in the slit heater and the high-temperature non-contact heat treatment was not carried out.

The characteristics of the obtained fiber are as shown in Table 5. Because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was good as well.

The fiber that was obtained in Example 19 exhibited a $Tm_1$ of 345° C., a $\Delta Hm_1$ of 7.8 J/g, a half width of peak at $Tm_1$ of 6.3° C., and an amount of scum generated of 0.0012 g.

From the above result, although there were some concerns about yarn breakage, the tension fluctuation was small and the scum generation was suppressed in practical warping and weaving steps as well. It would be expected to have excellent characteristics with few defects when made into a mesh woven fabric for a screen gauze for printing, a filter or the like.

As for factors causing slightly lower weavability than Example 1, it is presumed that, because the heat treatment was not carried out, fibrils were easy to be generated by scratches in the step, which resulted in yarn breakage at the time of weaving.

Example 20

A liquid crystalline polyester fiber was obtained in the same manner as described in Example 19 except that the liquid crystalline polyester polymer of Reference Example 2 at the time of the spinning.

The characteristics of the obtained fiber are as shown in Table 5. Because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was good as well. Further, the fiber obtained in the spinning before the solid-phase polymerization exhibited a fineness of 6.0 dtex, a strength of 8.8 cN/dtex, an elongation of 2.0%, and an elastic modulus of 532 cN/dtex. The strength, elongation and elastic modulus were improved as compared to those before the solid-phase polymerization and thus it was confirmed that the solid-phase polymerization proceeded.

The fiber that was obtained in Example 20 exhibited a $Tm_1$ of 320° C., a $\Delta Hm_1$ of 11 J/g, a half width of peak at $Tm_1$ of 7.5° C., and an amount of scum generated of 0.0012 g.

From the above result, although there were some concerns about yarn breakage, the tension fluctuation was small and the scum generation was suppressed in practical warping and weaving steps as well. It would be expected to have excellent characteristics with few defects when made into a mesh woven fabric for a screen gauze for printing, a filter or the like.

As for factors causing slightly lower weavability than Example 1, it is presumed that, because the heat treatment was not carried out, fibrils were easy to be generated by scratches in the step, which resulted in yarn breakage at the time of weaving.

TABLE 5

|  |  | Example 17 | Example 18 | Example 19 | Example 20 |
| --- | --- | --- | --- | --- | --- |
| Liquid crystalline polyesterpolymer | — | Reference Example 1 | Reference Example 1 | Reference Example 1 | Reference Example 2 |
| Inorganic particle (A) | — | Talc 1 | Talc 1 | Talc 1 | Talc 1 |
| Median diameter (D50) | μm | 1.0 | 1.0 | 1.0 | 1.0 |
| Phosphate-based compound (B) | — | Phosphate-based compound ($B_1$) | Phosphate-based compound ($B_1$) | Phosphate-based compound ($B_1$) | Phosphate-based compound ($B_1$) |
| Oil adhesion rate of solid-phase polymerization oil agent (a + b) | wt % | 15 | 15 | 15 | 15 |
| a | wt % | 2.1 | 2.1 | 2.1 | 2.1 |
| b/a |  | 6 | 6 | 6 | 6 |
| The presence of cleaning step | — | Present | Present | Present | Present |
| The presence of high temperature heat treatment step | — | Present | Present | Absent | Absent |

TABLE 5-continued

|  |  | Example 17 | Example 18 | Example 19 | Example 20 |
|---|---|---|---|---|---|
| The number of filaments | Filaments | 1 | 1 | 1 | 1 |
| Single fiber fineness | dtex | 4.0 | 13.0 | 6.0 | 6.0 |
| Strength | cN/dtex | 16.9 | 15.4 | 22.5 | 20.1 |
| Elongation | % | 2.7 | 2.4 | 2.4 | 2.8 |
| Elastic modulus | cN/dtex | 724 | 715 | 1081 | 851 |
| The presence of particulates in finishing oil agent | — | Absent | Absent | Absent | Absent |
| Oil adhesion rate | % | 1 | 1 | 1.1 | 1.2 |
| Oil adhesion rate of residual solid-phase polymerization oil agent | % | 0.2 | 0.1 | 0.2 | 0.2 |
| Oil adhesion rate of finishing oil agent | % | 0.8 | 0.9 | 0.9 | 1.0 |
| Running tension fluctuation range (R) | cN | 3.2 | 3.8 | 4.8 | 4.7 |
| Process passability | — | A | A | A | A |
| Weavability | — | A (5 times) | A (Twice) | B (6 times) | B (7 times) |
| Quality of woven fabric | — | A (1) | A (2) | A (1) | A (2) |

Examples 21 to 23

A liquid crystalline polyester fiber was obtained in the same manner as described in Example 1 except that the rotation number of an oiling roller at the time of the addition of the finishing oil agent was altered and the oil adhesion rate of the finishing oil agent was altered.

The characteristics of the obtained fiber are as shown in Table 6. Because the oil adhesion rate of residual solid-phase polymerization oil agent was very low and the running tension fluctuation range (R) was small, the scum generation and tension fluctuation were suppressed and the process passability and quality of woven fabric were excellent. The weavability was excellent or good as well. We confirmed that, as the oil adhesion rate of the finishing oil agent increased, the frequency of yarn breakage ascribed to pseudo adhesion of the fiber tended to increase to lower the weavability.

The fiber that was obtained in Example 21 exhibited a $Tm_1$ of 338° C., a $\Delta Hm_1$ of 0.6 J/g, a half width of peak at $Tm_1$ of 24° C., and an amount of scum generated of 0.0007 g. The fiber that was obtained in Example 22 exhibited a $Tm_1$ of 335° C., a $\Delta Hm_1$ of 0.7 J/g, a half width of peak at $Tm_1$ of 27° C., and an amount of scum generated of 0.0007 g. The fiber that was obtained in Example 23 exhibited a $Tm_1$ of 337° C., a $\Delta Hm_1$ of 0.5 J/g, a half width of peak at $Tm_1$ of 23° C., and an amount of scum generated of 0.0009 g.

From the above result, the tension fluctuation was small and the scum generation was suppressed in practical warping and weaving steps as well. It would be expected to have excellent characteristics with few defects when made into a mesh woven fabric for a screen gauze for printing, a filter or the like.

Example 24

The liquid crystalline polyester of Reference Example 1 and polyetheretherketone polymer PEEK 90G (melting point 344° C., hereinafter PEEK) manufactured by Victrex Manufacturing Limited were used. A blend fiber comprising liquid crystalline polyesters was obtained by carrying out spinning, winding back, solid-phase polymerization, cleaning, high temperature heat treatment in the same manner as described in Example 1 except that the liquid crystalline polyester and PEEK were mixed in the form of pellets at a weight ratio of 90/10, and then melted and knead by an extruder.

The characteristics of the obtained fiber are as shown in Table 6. A slight decrease in the strength and elastic modulus was observed when compared with those of the fiber of Example 1. Yet, because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was good as well.

The fiber that was obtained in Example 24 exhibited a $Tm_1$ of 344° C., a $\Delta Hm_1$ of 4.4 J/g, a half width of peak at $Tm_1$ of 15.47° C., and an amount of scum generated of 0.0012 g.

From the above result, although there were some concerns about yarn breakage, the tension fluctuation was small and the scum generation was suppressed in practical warping and weaving steps as well. It would be expected to have excellent characteristics with few defects when made into a mesh woven fabric for a screen gauze for printing, a filter or the like.

As for factors causing slightly lower weavability than Example 1, it is presumed that, because it was a blend fiber of different kinds of polymers, fibrils of the fiber were easy to be generated by detachment at a polymer interface by scratches in the step, which resulted in an increase in the number of times of yarn breakage at the time of weaving.

The fiber obtained in the spinning exhibited a fineness of 6.0 dtex, a strength of 5.6 cN/dtex, an elongation of 1.2%, and an elastic modulus of 432 cN/dtex; and the fiber after the solid-phase polymerization exhibited a fineness of 6.0 dtex, a strength of 22.1 cN/dtex, an elongation of 2.3%, and an elastic modulus of 985 cN/dtex. The strength, elongation and elastic modulus were improved as compared to those of the fiber before the solid-phase polymerization and thus it was confirmed that the solid-phase polymerization proceeded.

Example 25

A compound fiber comprising liquid crystalline polyesters at a weight ratio of the core to the sheath of 70/30 was obtained by carrying out spinning, winding back, solid-phase polymerization, cleaning, high temperature heat treatment in the same manner as described in Example 1 except that the liquid crystalline polyester of Reference Example 1 and PEEK were used as a core component and sheath polymer, respectively; and the liquid crystalline polyester and PEEK that were melted by a separate extruder were supplied to a die for core-sheath compound fiber.

The characteristics of the obtained fiber are as shown in Table 6. A slight decrease in the strength and elastic modulus was observed when compared with those of the fiber of Example 1. Yet, because the oil adhesion rate of residual solid-phase polymerization oil agent was very low and the running tension fluctuation range (R) was small, the scum generation and tension fluctuation were suppressed and the process passability and quality of woven fabric were excellent. In addition, the weavability was good as well.

The fiber that was obtained in Example 25 exhibited a $Tm_1$ of 344° C., a $\Delta Hm_1$ of 13 J/g, a half width of peak at $Tm_1$ of 16° C., and an amount of scum generated of 0.0010 g.

From the above result, although there were some concerns about yarn breakage, the tension fluctuation was small and the scum generation was suppressed in practical warping and weaving steps as well. It would be expected to have excellent characteristics with few defects when made into a mesh woven fabric for a screen gauze for printing, a filter or the like.

As for factors causing slightly lower weavability than Example 1, it is presumed that, because it was a core-sheath compound fiber with a different kind of polymer, fibrils of the fiber were easy to be generated by detachment at a polymer interface by scratches in the step, which resulted in an increase in the number of times of yarn breakage at the time of weaving.

The fiber obtained in the spinning exhibited a fineness of 6.0 dtex, a strength of 4.9 cN/dtex, an elongation of 1.0%, and an elastic modulus of 343 cN/dtex; and the fiber after the solid-phase polymerization exhibited a fineness of 6.0 dtex, a strength of 16.7 cN/dtex, an elongation of 1.7%, and an elastic modulus of 758 cN/dtex. The strength, elongation and elastic modulus were improved as compared to those of the fiber before the solid-phase polymerization and thus it was confirmed that the solid-phase polymerization proceeded.

Reference Example 3

A liquid crystalline polyester fiber was obtained in the same manner as described in Example 1 except that the cleaning was not carried out after the solid-phase polymerization step.

The characteristics of the obtained fiber are as shown in Table 7. Because the oil adhesion rate of residual solid-phase polymerization oil agent was high; and the running tension fluctuation range (R) was high, the process passability was good. However, the weavability and quality of woven fabric were inferior. The amount of scum generated of the fiber that was obtained in Reference Example 3 was 0.0636 g.

From the above results, it is predicted that troubles occur frequently when it is made to a mesh woven fabric for a screen gauze for printing, a filter or the like. However, it is proven from Reference Example 3 that, without carrying out the cleaning, the fiber is coated with salts and particles which are powders on the fiber surface, which decreases running resistance by an action of powder mold releasing and can prevent fibrillation by scratch of the fiber, thereby enhancing running stability. In addition, it is implied that the fiber is excellent in processability because both can be readily cleaned and removed by water and thus a state of adhered substances being substantially absence on the fiber surface by cleaning with water when the fiber is made to a product is generated, which enhances adhesion property with chemical solution or resins.

Comparative Example 1

When the solid-phase polymerization was carried out in the same manner as Example 1 except that the inorganic

TABLE 6

| | | Example 21 | Example 22 | Example 23 | Example 24 | Example 25 |
|---|---|---|---|---|---|---|
| Liquid crystalline polyesterpolymer | — | Reference Example 1 | Reference Example 1 | Reference Example 1 | Reference Example 1 (blend) | Reference Example 1 (composite) |
| Inorganic particle (A) | — | Talc 1 | Talc 1 | Talc 1 | Talc 1 | Talc 1 |
| Median diameter (D50) | μm | 1.0 | 1.0 | 1.0 | 1.0 | 1.0 |
| Phosphate-based compound (B) | — | Phosphate-based compound ($B_1$) | Phosphate-based compound ($B_1$) | Phosphate-based compound ($B_1$) | Phosphate-based compound ($B_1$) | Phosphate-based compound ($B_1$) |
| Oil adhesion rate of solid-phase polymerization oil agent (a + b) | wt % | 15 | 15 | 15 | 15 | 15 |
| a | wt % | 2.1 | 2.1 | 2.1 | 2.1 | 2.1 |
| b/a | — | 6 | 6 | 6 | 6 | 6 |
| The presence of cleaning step | — | Present | Present | Present | Present | Present |
| The presence of high temperature heat treatment step | — | Present | Present | Present | Present | Present |
| The number of filaments | Filaments | 1 | 1 | 1 | 1 | 1 |
| Single fiber fineness | dtex | 6.0 | 6.0 | 6.0 | 6.0 | 6.0 |
| Strength | cN/dtex | 17.8 | 17.8 | 17.7 | 16.3 | 13.8 |
| Elongation | % | 2.8 | 2.8 | 2.8 | 2.5 | 2.2 |
| Elastic modulus | cN/dtex | 752 | 736 | 727 | 624 | 498 |
| The presence of particulates in finishing oil agent | — | Absent | Absent | Absent | Absent | Absent |
| Oil adhesion rate | % | 1.5 | 2.0 | 3.0 | 1.0 | 1.0 |
| Oil adhesion rate of residual solid-phase polymerization oil agent | % | 0.1 | 0.1 | 0.1 | 0.1 | 0.2 |
| Oil adhesion rate of finishing oil agent | % | 1.4 | 1.9 | 2.9 | 0.9 | 0.8 |
| Running tension fluctuation range (R) | cN | 3.4 | 3.9 | 4.3 | 3.8 | 3.9 |
| Process passability | — | A | A | A | A | A |
| Weavability | — | A (Once) | A (4 times) | B (7 times) | B (8 times) | B (9 times) |
| Quality of woven fabric | — | A (0) | A (1) | A (1) | A (2) | A (3) | particle (A) was solely used as an oil agent for solid-phase polymerization, and the phosphate-based compound (B) was not used, the fibers fused each other and fibrils occurred many times at the time of unwinding, which led to yarn breakage, and thus steps subsequent to the cleaning step could not be carried out.

Comparative Example 2

A liquid crystalline polyester fiber was obtained in the same manner as described in Example 1 except that a spinning oil agent with polyethylene glycol laurate as a main component, instead of the phosphate-based compound (B), was used as an oil agent for solid-phase polymerization.

The characteristics of the obtained fiber are as shown in Table 7. Because the oil adhesion rate of residual solid-phase polymerization oil agent was high; and the running tension fluctuation range (R) was high, a large amount of scum was accumulated onto yarn supply port and the scum was contaminated into the product many times and the quality of woven fabric was not good. Further, yarn breakage also occurred frequently. Presumably, this was, in addition to yarn breakage ascribed to increased tension fluctuation by scum accumulation, yarn breakage ascribed to fibrillation of the fiber which was caused by fusion bonding at the time of solid-phase polymerization.

The fiber that was obtained in Comparative Example 2 exhibited a $Tm_1$ of 332° C., a $\Delta Hm_1$ of 0.7 J/g, a half width of peak at $Tm_1$ of 25° C., and an amount of scum generated of 0.0110 g.

From the above results, we predicted not only that, also in practical warping and weaving steps, a large amount of scum is generated; the running tension fluctuation increases; and yarn breakage occurs; but also that troubles occur frequently when it is made to a mesh woven fabric for a screen gauze for printing, a filter or the like.

Comparative Example 3

A liquid crystalline polyester fiber was obtained in the same manner as described in Example 1 except that the inorganic particle (A) was not used as an oil agent for solid-phase polymerization.

In the obtained fiber, generation of fibrils was recognized. Presumably, this is because the inorganic particle (A) was not used as the solid-phase polymerization oil agent and thus fusion bonding was occurred among the fibers. The characteristics of the obtained fiber are as shown in Table 7. Because the oil adhesion rate of residual solid-phase polymerization oil agent was high; and the running tension fluctuation range (R) was high, a large amount of scum was accumulated onto yarn supply port; yarn breakage that was apparently ascribed to scum and fibrils occurred many times; and the weaving was thus discontinued.

The fiber that was obtained in Comparative Example 3 exhibited a $Tm_1$ of 335° C., a $\Delta Hm_1$ of 0.6 J/g, a half width of peak at $Tm_1$ of 24° C., and an amount of scum generated of 0.0113 g.

From the above results, we predicted that a large amount of scum is generated and yarn breakage ascribed to scum and fibrils occurs also in practical warping and weaving steps; and thus the weaving is impossible.

Comparative Example 4

A liquid crystalline polyester fiber was obtained in the same manner as described in Example 1 except that, instead of the inorganic particles (A) and phosphate-based compound (B), an oil agent with polydimethylsiloxane (hereinafter PDMS) as a main component was used as the oil agent for solid-phase polymerization.

The characteristics of the obtained fiber are as shown in Table 7. Although the amount of remaining solid-phase polymerization oil agent is mathematically small, running tension fluctuation was high and a very small amount of scum accumulation on the yarn supply port was observed during the weaving. This apparently caused increase in running tension and contamination of scum into the product. In addition, yarn breakage that was apparently caused by tension fluctuation occurred many times. From results of scanning electron microscopy for the surface of the liquid crystalline polyester fiber, irregularity which seems to come from gelled products of PDMS was observed. Also, from results of IR measurement of scum components adhered to the yarn supply port at the time of weaving evaluation, gelled products derived from PDMS were found to adhere on the fiber. That is, PDMS gelled at the time of the solid-phase polymerization and this gelled product remained on the fiber after the cleaning step, which presumably caused tension fluctuation.

The fiber that was obtained in Comparative Example 4 exhibited a $Tm_1$ of 336° C., a $\Delta Hm_1$ of 0.7 J/g, a half width of peak at $Tm_1$ of 27° C., and an amount of scum generated of 0.0025 g.

From the above results, increase in tension fluctuation is facilitated; in addition to weavability defects caused by occurrence of yarn breakage by tension fluctuation at the time of warping and generation of tension unevenness or yarn breakage at the time of weaving, contamination of the scum into the product takes place.

Comparative Example 5

A liquid crystalline polyester fiber was obtained in the same manner as described in Example 1 except that the rotation number of an oiling roller at the time of the addition of the finishing oil agent was altered and the oil adhesion rate of the finishing oil agent was altered and the oil adhesion rate of the fiber was set to 3.2 wt %.

The characteristics of the obtained fiber are as shown in Table 7. Because the oil adhesion rate of residual solid-phase polymerization oil agent was very low and the running tension fluctuation range (R) was small, the scum generation and tension fluctuation were suppressed and the process passability and quality of woven fabric were excellent. However, machine stopping caused by yarn breakage ascribed to pseudo adhesion of fibers occurred frequently, and the weaving was thus discontinued.

The fiber that was obtained in Comparative Example 5 exhibited a $Tm_1$ of 333° C., a $\Delta Hm_1$ of 0.8 J/g, a half width of peak at $Tm_1$ of 29° C., and an amount of scum generated of 0.0012 g.

From the above results, it is predicted that, although the effect of suppressing the scum is prominent also in practical warping and weaving steps, fibers falsely adhere each other due to a high oil adhesion rate and thus yarn breakage occurs many times; and the weaving is impossible.

TABLE 7

|  |  | Reference Example 3 | Comparative Example 1 | Comparative Example 2 | Comparative Example 3 | Comparative Example 4 | Comparative Example 5 |
| --- | --- | --- | --- | --- | --- | --- | --- |
| Liquid crystalline polyesterpolymer | — | Reference Example 1 | Reference Example 1 | Reference Example 1 | Reference Example 1 | Reference Example 1 | Reference Example 1 |
| Inorganic particle (A) |  | Talc 1 | Talc 1 | Talc 1 | — | — | Talc 1 |
| Median diameter (D50) | μm | 1.0 | 1.0 | 1.0 | — | — | 1.0 |
| Phosphate-based compound (B) | — | Phosphate-based compound ($B_1$) | — | Spinning oil agent | Phosphate-based compound ($B_1$) | PDMS | Phosphate-based compound ($B_1$) |
| Oil adhesion rate of solid-phase polymerization oil agent (a + b) | wt % | 15 | 2.2 | 4.3 | 4.1 | 6.5 | 15 |
| a | wt % | 2.1 | 2.2 | 0.6 | 0.0 | 0.0 | 2.1 |
| b/a | — | 6 | 0 | 6 | — | — | 6 |
| The presence of cleaning step | — | Absent | — | Present | Present | Present | Present |
| The presence of high temperature heat treatment step | — | Present | — | Present | Present | Present | Present |
| The number of filaments | Filaments | 1 | 1 | 1 | 1 | 1 | 1 |
| Single fiber fineness | dtex | 6.0 | 6.0 | 6.0 | 6.0 | 6.0 | 6.0 |
| Strength | cN/dtex | 17.9 | — | 16.5 | 16.6 | 17.2 | 17.6 |
| Elongation | % | 2.8 | — | 2.3 | 2.5 | 2.6 | 2.7 |
| Elastic modulus | cN/dtex | 754 | — | 638 | 679 | 739 | 714 |
| The presence of particulates in finishing oil agent | — | Absent | — | Absent | Absent | Absent | Absent |
| Oil adhesion rate | % | 8.1 | — | 2.3 | 3.0 | 0.9 | 3.2 |
| Oil adhesion rate of residual solid-phase polymerization oil agent | % | 7.3 | — | 1.3 | 2.1 | 0.1 | 0.1 |
| Oil adhesion rate of finishing oil agent | % | 0.8 | — | 1.0 | 0.9 | 0.8 | 3.1 |
| Running tension fluctuation range (R) | cN | 5.1 | — | 12.1 | 5.2 | 11.3 | 4.9 |
| Process passability | — | B | — | C | C | C | A |
| Weavability | — | C (11 times) | — | C (11 times) | C (15 times) | C (12 times) | C (15 times) |
| Quality of woven fabric | — | C (12) | — | C (15) | — | B (6) | — |

In the examples below, with the assumption of post processing in multifilament applications in particular, an effect of suppressing fusion bonding, running stability, and post-processability were evaluated as characteristic evaluation of the liquid crystalline polyester fiber after the solid-phase polymerization.

Example 26

Using the liquid crystalline polyester of Reference Example 1, vacuum drying was carried out at 160° C. for 12 hours and it was then melt extruded by a double-screw extruder of Φ15 mm manufactured by Technovel Corporation, and the polymer was supplied to a spinning pack while metered by a gear pump. In the spinning pack, the polymer was filtered using a metal nonwoven fabric filter, and the polymer was discharged in conditions described in Table 8. The introduction hole positioned immediately above the die hole was a straight hole, and a connecting portion between the introduction hole and the die hole was formed in a taper shape. The discharged polymer was passed through a heat retaining region of 40 mm, and then cooled and solidified from the outer side of the yarn by an annular cooling air with 25° C. air flow. Thereafter, a spinning oil agent whose main component was a fatty acid ester compound was added, and all of the filaments were together wound to a first godet roller at a spinning speed described in Table 8. This was passed through a second godet having the same speed and then wound in a pirn form via a dancer arm using a pirn winder (EFT type take up winder manufactured by Kamitsu Seisakusho Ltd., no contact roller contacting with a wound package). During the winding, no yarn breakage occurred and the yarn formation property was good. The characteristics of the obtained spun fiber are shown in Table 8.

TABLE 8

|  |  |  | Example 26 | Example 34 | Example 35 | Example 36 | Example 37 | Example 38 |
| --- | --- | --- | --- | --- | --- | --- | --- | --- |
| Liquid crystalline polyesterpolymer |  |  | Reference Example 1 | Reference Example 2 | Reference Example 1 | Reference Example 1 | Reference Example 1 | Reference Example 1 |
| Melt spinning condition | Spinning temperature | ° C. | 340 | 325 | 340 | 345 | 345 | 345 |
|  | Discharge flow | g/min | 100.2 | 100.2 | 56.0 | 2.6 | 150.0 | 2.4 |
|  | Hole diameter of die | mm | 0.13 | 0.20 | 0.13 | 0.13 | 0.28 | 0.13 |
|  | Land length | mm | 0.26 | 0.30 | 0.26 | 0.26 | 0.50 | 0.26 |
|  | L/D | — | 2.0 | 1.5 | 2.0 | 2.0 | 1.8 | 2.0 |
|  | The number of holes |  | 300 | 300 | 72 | 5 | 192 | 4 |
|  | Spinning speed | m/min | 600 | 600 | 1000 | 1200 | 500 | 1000 |
|  | Spinning draft | — | 29 | 68 | 20 | 36 | 47 | 27 |
| Characteristics of spun fiber | Molecular weight | — | $10.3 \times 10^4$ | $8.8 \times 10^4$ | $10.2 \times 10^4$ | $10 \times 10^4$ | $10.3 \times 10^4$ | $10.2 \times 10^4$ |
|  | Total fineness | dtex | 1670 | 1670 | 560 | 22 | 3000 | 6 |
|  | The number of filaments | Filaments | 300 | 300 | 72 | 5 | 192 | 1 |
|  | Single fiber fineness | dtex | 5.6 | 5.6 | 7.8 | 4.4 | 15.6 | 6.0 |
|  | Strength | cN/dtex | 6.5 | 8.8 | 6.3 | 6.7 | 5.9 | 6.4 |
|  | Elongation | % | 1.5 | 2.0 | 1.5 | 1.5 | 1.4 | 1.5 |

TABLE 8-continued

|  |  | Example 26 | Example 34 | Example 35 | Example 36 | Example 37 | Example 38 |
|---|---|---|---|---|---|---|---|
| Elastic modulus | cN/dtex | 550 | 543 | 554 | 578 | 524 | 531 |
| $Tm_1$ | °C. | 299 | 285 | 298 | 298 | 297 | 297 |
| $\Delta Hm_1$ | J/g | 2.4 | 3.1 | 2.6 | 2.5 | 2.5 | 2.6 |
| Half width of peak of at $Tm_1$ | °C. | 38 | 43 | 40 | 37 | 39 | 41 |

The fibers were wound back from this spun fiber package using an SSP-MV type rewinder (contact length (winding stroke of the innermost layer) of 200 mm, the number of winding of 8.7, taper angle of 45°) manufactured by Kamitsu Seisakusho Ltd. The spun fibers are unwound in a vertical direction (in a direction perpendicular to the fiber rounding direction). Without using a speed-regulating roller, using an oiling roller (having a stainless-steel roll with pear skin-finished surface), solid-phase polymerization oil agent was fed, wherein SG-2000 (manufactured by Nippon Talc Co., Ltd.) shown as Talc 1 in Table 9, as an inorganic particle (A), was dispersed into aqueous solution containing 6.0 wt % phosphate-based compound (B1) represented by the following chemical formula (4) as the phosphate-based compound (B) in the amount of 1.0 wt %. A stainless-steel bobbin with holes and wound thereon with a Kevlar felt (weight: 280 g/m2, thickness: 1.5 mm) was used as a core member for the winding back, and the surface pressure was set to 100 gf (98.0665 cN). The oil adhesion rate of the solid-phase polymerization oil agent to the fiber after the winding back and winding back condition are shown in Table 9.

Next, the bobbin with holes was detached from the package wound back, and solid-phase polymerization was carried out in a condition of a package where the fibers were taken up on the Kevlar felt. The solid-phase polymerization was carried out using a closed type oven at a condition where the temperature was elevated from a room temperature to 240° C. over about 30 minutes, kept at 240° C. for 3 hours, elevated to maximum achieving temperature shown in Table 9 at a rate of 4° C./hr, and kept for a period of holding time shown in Table 9. As the atmosphere, dehumidified nitrogen was supplied at a flow rate of 20 NL/min, and it was discharged from an exhaust port to not pressurize the inside.

The package after the solid-phase polymerization was attached to a free roll creel (which had an axis, bearings and a freely-rotatable outer layer and which had no brakes and no drive source), and therefrom a yarn was drawn out in a lateral direction (in a fiber rounding direction), rolled on a first roller with separate roller rotating at 400 m/min by 6 rounds and taken up by an EFT type bobbin traverse winder (manufactured by Kamitsu Seisakusho Ltd.). The characteristics of the obtained fiber after the solid-phase polymerization are shown in Table 9.

The results of characteristic evaluation of the obtained fiber are also shown in Table 9. It is proven that all of the effect of suppressing fusion bonding, running stability, and post-processability are excellent.

TABLE 9

|  |  |  | Example 26 | Example 27 | Example 28 | Example 29 |
|---|---|---|---|---|---|---|
|  | Spun fiber |  | Example 26 | Example 26 | Example 26 | Example 26 |
| Oil agent for solid-phase polymerization | Inorganic particle (A) | — | Talc 1 | Talc 1 | Talc 1 | Silica |
|  | Median diameter (D50) | μm | 1.0 | 1.0 | 1.0 | 2.7 |
|  | Phosphate-based compound (B) or other oil agents | — | $B_1$ | $B_1$ | $B_1$ | $B_1$ |
|  | Oil adhesion rate of solid-phase polymerization oil agent (a + b) | wt % | 15 | 2.1 | 30 | 15 |
|  | a | wt % | 2.1 | 0.3 | 4.3 | 2.1 |
|  | b/a | — | 6.0 | 6.0 | 6.0 | 6.0 |
| Winding back condition | Winding back speed | m/min | 400 | 400 | 400 | 400 |
|  | Winding tension | cN/dtex | 0.02 | 0.02 | 0.02 | 0.02 |
|  | Winding density | g/cc | 0.8 | 0.8 | 0.8 | 0.8 |
|  | Winding volume | m | $3.2 \times 10^4$ | $3.2 \times 10^4$ | $3.2 \times 10^4$ | $3.2 \times 10^4$ |
|  | Winding volume | kg | 6.1 | 5.5 | 6.9 | 6.1 |
| Solid-phase polymerization | Maximum achieving temperature | °C. | 290 | 290 | 290 | 290 |
|  | Holding time at maximum achieving temperature | hr | 15 | 15 | 15 | 15 |
| Characteristics of fiber after solid-phase polymerization | Molecular weight | — | $38.1 \times 10^4$ | $38 \times 10^4$ | $38.3 \times 10^4$ | $38.2 \times 10^4$ |
|  | Total fineness | dtex | 1804 | 1695 | 1921 | 1790 |
|  | The number of filaments | Filaments | 300 | 300 | 300 | 300 |
|  | Single fiber fineness | dtex | 6.0 | 5.7 | 6.4 | 6.0 |
|  | Strength | cN/dtex | 20.4 | 20.1 | 20.2 | 20.3 |
|  | Elongation | % | 2.6 | 2.3 | 2.6 | 2.6 |
|  | Elastic modulus | cN/dtex | 922 | 865 | 904 | 920 |
|  | $Tm_1$ | °C. | 331 | 330 | 330 | 332 |
|  | $\Delta Hm_1$ | J/g | 8.3 | 8.3 | 8.5 | 8.2 |
|  | Half width of peak of at $Tm_1$ | °C. | 12 | 11 | 13 | 11 |
|  | Adhesion amount relative to total fineness | wt % | 8.0 | 1.5 | 15.0 | 7.2 |
| Characteristic Evaluation | Effect of suppressing fusion bonding (The number of times of fluffs) | — | A (0) | B (2) | A (0) | A (0) |
|  | Running stability (The number of times of yarn swinging) | — | A (0 times) | B (Twice) | A (0 times) | B (Once) |

TABLE 9-continued

| | | | Example 30 | Example 31 | Example 32 | Example 33 |
|---|---|---|---|---|---|---|
| | Post-processability (The number of times of adhered substances) | — | A (1) | B (6) | B (4) | A (1) |
| | Spun fiber | | Example 26 | Example 26 | Example 26 | Example 26 |
| Oil agent for solid-phase polymerization | Inorganic particle (A) | — | Talc 2 | Talc 1 | Talc 1 | Talc 1 |
| | Median diameter (D50) | μm | 7.0 | 1.0 | 1.0 | 1.0 |
| | Phosphate-based compound (B) or other oil agents | — | $B_1$ | $B_1$ | $B_2$ | $B_3$ |
| | Oil adhesion rate of solid-phase polymerization oil agent (a + b) | wt % | 15 | 15 | 15 | 15 |
| | a | wt % | 2.1 | 5.0 | 2.1 | 2.1 |
| | b/a | — | 6.0 | 2.0 | 6.0 | 6.0 |
| Winding back condition | Winding back speed | m/min | 400 | 400 | 400 | 400 |
| | Winding tension | cN/dtex | 0.02 | 0.02 | 0.02 | 0.02 |
| | Winding density | g/cc | 0.8 | 0.8 | 0.8 | 0.8 |
| | Winding volume | m | $3.2 \times 10^4$ | $3.2 \times 10^4$ | $3.2 \times 10^4$ | $3.2 \times 10^4$ |
| | Winding volume | kg | 6.1 | 6.1 | 6.1 | 6.1 |
| Solid-phase polymerization | Maximum achieving temperature | ° C. | 290 | 290 | 290 | 290 |
| | Holding time at maximum achieving temperature | hr | 15 | 15 | 15 | 15 |
| Characteristics of fiber after solid-phase polymerization | Molecular weight | — | $38.3 \times 10^4$ | $38.1 \times 10^4$ | $36.4 \times 10^4$ | $41.1 \times 10^4$ |
| | Total fineness | dtex | 1755 | 1787 | 1834 | 1800 |
| | The number of filaments | Filaments | 300 | 300 | 300 | 300 |
| | Single fiber fineness | dtex | 5.9 | 6.0 | 6.1 | 6.0 |
| | Strength | cN/dtex | 19.7 | 20.4 | 19.5 | 21.7 |
| | Elongation | % | 2.5 | 2.5 | 2.3 | 2.8 |
| | Elastic modulus | cN/dtex | 882 | 902 | 867 | 955 |
| | $Tm_1$ | ° C. | 331 | 332 | 330 | 333 |
| | $\Delta Hm_1$ | J/g | 8.2 | 8.3 | 8.0 | 8.8 |
| | Half width of peak of at $Tm_1$ | ° C. | 12 | 11 | 12 | 10 |
| | Adhesion amount relative to total fineness | wt % | 5.1 | 7.0 | 9.8 | 7.8 |
| Characteristic Evaluation | Effect of suppressing fusion bonding (The number of times of fluffs) | — | B (1) | A (0) | A (0) | B (2) |
| | Running stability (The number of times of yarn swinging) | — | B (Once) | A (0 times) | A (0 times) | B (Twice) |
| | Post-processability (The number of times of adhered substances) | — | A (1) | B (3) | B (4) | A (1) |

Examples 27 and 28

Effects of the adhesion rate of oil agent for solid-phase polymerization were evaluated here.

A spun fiber was obtained by carrying out melt spinning in the same manner as described in Example 26 and a liquid crystalline polyester fiber was obtained by carrying out the winding back and solid-phase polymerization in the same manner as described in Example 26 except that the rotation number of the oiling roller at the time of the winding back was altered and the adhesion rate of the solid-phase polymerization oil agent was altered as shown in Table 9. The characteristics of the obtained fiber after the solid-phase polymerization are shown in Table 9.

The results of characteristic evaluation of the obtained fiber are also shown in Table 9. We proved that, although all of the effect of suppressing fusion bonding, running stability, and post-processability are excellent, the effect of suppressing fusion bonding, running stability, and post-processability are slightly inferior in Example 27 because the adhesion amount is low; and the post-processability is slightly inferior in Example 28 because the adhesion amount is high.

Examples 29 and 30

Effects of the inorganic particle (A) were evaluated here.

A liquid crystalline polyester fiber was obtained in the same manner as described in Example 26 except that Sylisia 310P (manufactured by Fuji Silysia Chemical Ltd.) which was silica was used as the inorganic particle (A) (Example 29). Further, a liquid crystalline polyester fiber was obtained in the same manner as described in Example 26 except that "MICRO ACE" (registered trademark) P-2 (manufactured by Nippon Talc Co., Ltd.) which was a talc shown as Talc 2 in Table 9 was used as the inorganic particle (A). The characteristics of the obtained fiber after the solid-phase polymerization are shown in Table 9.

The results of characteristic evaluation of the obtained fiber are also shown in Table 9. Wes proved that, although all of the effect of suppressing fusion bonding, running stability, and post-processability are excellent, the effect of suppressing fusion bonding, running stability, and post-processability deteriorate as the median diameter become larger.

Example 31

Effects of the weight ratio between the inorganic particle (A) and phosphate-based compound (B) were evaluated here.

A liquid crystalline polyester fiber was obtained in the same manner as described in Example 26 except that the amount of dispersion of the inorganic particle (A) in the solid-phase polymerization oil agent and the adhesion rate (a) of the inorganic particle to the fiber was altered as shown in Table 9. The characteristics of the obtained fiber after the solid-phase polymerization are shown in Table 9.

The results of characteristic evaluation of the obtained fiber are also shown in Table 9. We proved that, although all of the effect of suppressing fusion bonding, running stability, and post-processability are excellent, the post-processability slightly deteriorates when (b/a) is small.

Examples 32 and 33

Effects of the phosphate-based compound (B) were evaluated here.

A liquid crystalline polyester fiber was obtained in the same manner as described in Example 26 except that the phosphate-based compound (B) was altered to a phosphate-based compound ($B_2$) represented by the following chemical formula (5) or a phosphate-based compound ($B_3$) represented by the following chemical formula (6). The characteristics of the obtained fiber after the solid-phase polymerization are shown in Table 9. As proven from numerical values including the molecular weight, the solid-phase polymerization tends not to proceed to a certain extent in $B_2$ and tends to proceed in $B_3$.

The results of characteristic evaluation of the obtained fiber are also shown in Table 9. We proved that, although all of the effect of suppressing fusion bonding, running stability, and post-processability are excellent, the post-processability is slightly inferior in $B_2$ possibly because it has a number of hydrocarbon groups containing oxygen atoms; and the post-processability and running stability are slightly inferior in $B_3$ possible because it has a number of potassium atoms and thus the solid-phase polymerization proceeds.

Comparative Examples 6 to 9

Effects of the combination use of the inorganic particle (A) and phosphate-based compound (B) were evaluated here.

In Comparative Example 6, When the solid-phase polymerization was carried out in the same manner as Example 26 except that the inorganic particle (A) was solely used as an oil agent for solid-phase polymerization, and the phosphate-based compound (B) was not used, the fibers fused each other and fibrils occurred many times at the time of unwinding, and thereby the fiber after solid-phase polymerization could not be obtained. From this, we proved that the effect is suppressing fusion bonding is not insufficient with the inorganic particle alone.

A liquid crystalline polyester fiber was obtained in the same manner as described in Examples 26 except that an aqueous PDMS dispersion liquid, instead of the phosphate-based compound (B), was used as the oil agent for solid-phase polymerization in Comparative Example 7; the inorganic particle was not used and the phosphate-based compound was solely used in Comparative Example 8; a PDMS dispersion liquid was solely used in Comparative Example 9; and the rotation number of the oiling roller was adjusted and the adhesion amount of solid-phase polymerization oil agent was altered as shown in Table 10 in each of the Examples. The characteristics of the obtained fiber after the solid-phase polymerization are shown in Table 10.

The results of characteristic evaluation of the obtained fiber are also shown in Table 10. In Comparative Example 7, we proved that, although an excellent effect of suppressing fusion bonding was exhibited by combination used of the inorganic particle and PDMS, there are a number of adhered substances on the fiber surface and the post-processability is inferior. Further, in Comparative Example 8, we proved that the effect of suppressing fusion bonding and running stability are inferior because the phosphate-based compound is solely used. In Comparative Example 9, we proved that with PDMS being solely used, the running stability and post-processability are inferior.

Examples 34 to 38

Effects of the spun fiber were evaluated here.

A spun fiber was obtained by carrying out melt spinning by the same method as described in Example 26 except that the spinning conditions including the liquid crystalline polyester polymer and spinning temperature were altered as shown in Table 8. In Example 38, among yarns discharged from the die with 4 holes, only one yarn was taken up and the remaining were sucked by the suction gun to remove. The characteristics of the obtained fibers are also shown together in Table 8. In Example 34 where the polymer of Comparative Example 2 was used and in Example 36 where the spinning was carried out with a single-yarn fineness of 4.4 dtex, yarn breakage occurred during the spinning.

Using the obtained spun fiber, the winding back and solid-phase polymerization were carried out by the same manner as Example 26 except that the winding back condition and solid-phase polymerization condition were altered as shown in Table 10. In Example 37, three of the spun fibers were twisted together and wound back. The characteristics of the obtained fiber after the solid-phase polymerization are shown in Table 10.

The results of characteristic evaluation of the obtained fiber are also shown in Table 10. We proved that, although the effect of suppressing fusion bonding, running stability, and post-processability vary in the different types of the spun fiber, all of them are excellent.

TABLE 10

| | | | Comparative Example 6 | Comparative Example 7 | Comparative Example 8 | Comparative Example 9 | Example 34 |
|---|---|---|---|---|---|---|---|
| | Spun fiber | | Example 26 | Example 26 | Example 26 | Example 26 | Example 34 |
| Oil agent for solid-phase polymerization | Inorganic particle (A) | — | Talc 1 | Talc 1 | — | — | Talc 1 |
| | Median diameter (D50) | μm | 1.0 | 1.0 | — | — | 1.0 |
| | Phosphate-based compound (B) or other oil agents | — | — | PDMS | $B_1$ | PDMS | $B_1$ |
| | Oil adhesion rate of solid-phase polymerization oil agent | wt % | 2.1 | 4.3 | 4.1 | 6.5 | 15 |
| | a | wt % | 2.1 | 0.6 | 0.0 | 0.0 | 2.1 |
| | b/a | — | 0.0 | 5.0 | — | — | 6.0 |
| Winding back condition | Winding back speed | m/min | 400 | 400 | 400 | 400 | 400 |
| | Winding tension | cN/dtex | 0.02 | 0.02 | 0.02 | 0.02 | 0.02 |
| | Winding density | g/cc | 0.8 | 0.8 | 0.8 | 0.8 | 0.8 |
| | Winding volume | m | $3.2 \times 10^4$ | $3.2 \times 10^4$ | $3.2 \times 10^4$ | $3.2 \times 10^4$ | $3.2 \times 10^4$ |
| | Winding volume | kg | 5.5 | 5.6 | 5.6 | 5.7 | 6.1 |

TABLE 10-continued

| Category | Property | Unit | | | | | |
|---|---|---|---|---|---|---|---|
| Solid-phase polymerization | Maximum achieving temperature | °C. | 290 | 290 | 290 | 290 | 290 |
| | Holding time at maximum achieving temperature | hr | 15 | 15 | 15 | 15 | 15 |
| Characteristics of fiber after olid-phase polymerization | Molecular weight | — | Unable to evaluate due to occurrence of fusion bonding | $38.2 \times 10^4$ | $38.1 \times 10^4$ | $38.2 \times 10^4$ | $36.2 \times 10^4$ |
| | Total fineness | dtex | | 1733 | 1717 | 1723 | 1805 |
| | The number of filaments | Filaments | | 300 | 300 | 300 | 300 |
| | Single fiber fineness | dtex | | 5.8 | 5.7 | 5.7 | 6.0 |
| | Strength | cN/dtex | | 20.3 | 18.4 | 20.1 | 21.1 |
| | Elongation | % | | 2.5 | 2.2 | 2.5 | 2.8 |
| | Elastic modulus | cN/dtex | | 895 | 815 | 915 | 795 |
| | $Tm_1$ | °C. | | 332 | 330 | 332 | 319 |
| | $\Delta Hm_1$ | J/g | | 8.2 | 8.4 | 8.2 | 10.1 |
| | Half width of peak of at $Tm_1$ | °C. | | 11 | 10 | 12 | 7 |
| | Adhesion amount relative to total fineness | wt % | | 3.8 | 2.8 | 3.2 | 8.1 |
| Characteristic evaluation | Effect of suppressing fusion bonding (The number of times of | — | | A (0) | C (10) | B (2) | B (2) |
| | Running stability (The number of times of yarn swinging) | — | | B (Twice) | C (32 times) | C (10 times) | B (Twice) |
| | Post-processability (The number of times of adhered substances) | — | | C (15) | B (4) | C (13) | B (5) |

| | | | Example 35 | Example 36 | Example 37 | Example 38 |
|---|---|---|---|---|---|---|
| | Spun fiber | | Example 35 | Example 36 | Example 37 | Example 38 |
| Oil agent for solid-phase polymerization | Inorganic particle (A) | — | Talc 1 | Talc 1 | Talc 1 | Talc 1 |
| | Median diameter (D50) | μm | 1.0 | 1.0 | 1.0 | 1.0 |
| | Phosphate-based compound (B) or other oil agents | — | $B_1$ | $B_1$ | $B_1$ | $B_2$ |
| | Oil adhesion rate of solid-phase polymerization oil agent | wt % | 15 | 15 | 15 | 15 |
| | a | wt % | 2.1 | 2.1 | 2.1 | 2.1 |
| | b/a | — | 6.0 | 6.0 | 6.0 | 6.0 |
| Winding back condition | Winding back speed | m/min | 400 | 300 | 200 | 300 |
| | Winding tension | cN/dtex | 0.04 | 0.23 | 0.04 | 0.16 |
| | Winding density | g/cc | 1.0 | 0.6 | 0.9 | 0.5 |
| | Winding volume | m | $6.4 \times 10^4$ | $10.8 \times 10^4$ | $1.2 \times 10^4$ | $43.2 \times 10^4$ |
| | Winding volume | kg | 4.1 | 0.3 | 12.4 | 0.3 |
| Solid-phase polymerization | Maximum achieving temperature | °C. | 290 | 285 | 300 | 290 |
| | Holding time at maximum achieving temperature | hr | 15 | 15 | 20 | 15 |
| Characteristics of fiber after olid-phase polymerization | Molecular weight | — | $37.1 \times 10^4$ | $38.5 \times 10^4$ | $35.4 \times 10^4$ | $38.8 \times 10^4$ |
| | Total fineness | dtex | 603 | 24 | 9648 | 6 |
| | The number of filaments | Filaments | 72 | 5 | 576 | 1 |
| | Single fiber fineness | dtex | 8.4 | 4.8 | 16.8 | 6.4 |
| | Strength | cN/dtex | 20.2 | 22.4 | 17.8 | 22.1 |
| | Elongation | % | 2.6 | 2.7 | 2.1 | 2.7 |
| | Elastic modulus | cN/dtex | 901 | 1011 | 807 | 965 |
| | $Tm_1$ | °C. | 332 | 333 | 330 | 332 |
| | $\Delta Hm_1$ | J/g | 8.0 | 9.2 | 7.9 | 8.9 |
| | Half width of peak of at $Tm_1$ | °C. | 13 | 9 | 13 | 12 |
| | Adhesion amount relative to total fineness | wt % | 7.7 | 8.8 | 7.2 | 6.8 |
| Characteristic evaluation | Effect of suppressing fusion bonding (The number of times of | — | A (0) | B (1) | A (0) | B (1) |
| | Running stability (The number of times of yarn swinging) | — | A (0 times) | A (0 times) | A (0 times) | A (0 times) |
| | Post-processability (The number of times of adhered substances) | — | A (2) | A (1) | B (8) | A (0) |

Note)
PDMS: polydimethylsiloxane

INDUSTRIAL APPLICATIONS

A liquid crystalline polyester fiber and a method of producing the liquid crystalline polyester fiber are suitable in particular for uses of filters or screen gauzes that are high-mesh woven fabrics.

The invention claimed is:

1. A method of producing a liquid crystalline polyester fiber comprising: subjecting a yarn prepared by melt spinning a liquid crystalline polyester to a solid-phase polymerization after applying inorganic particles (A) and a phosphate-based compound (B) to said yarn, and
cleaning said liquid crystalline polyester fiber after said solid-phase polymerization.

2. The method according to claim 1, further comprising carrying out a high temperature heat treatment at a temperature of an endothermic peak temperature ($Tm_1$) of said liquid crystalline polyester fiber after said cleaning +10° C. or higher.

3. The method according to claim 1, wherein said inorganic particles (A) are one or more selected from silica and silicates.

4. The method according to claim 1, wherein said phosphate-based compound (B) comprises any of compounds represented by Formulae (1) to (3) or a combination thereof, and satisfies Conditions 1 to 4:

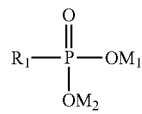

(1)

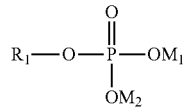

(2)

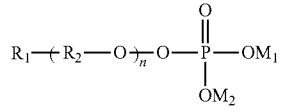

(3)

Condition 1: $R_1$ and $R_2$ represent a hydrocarbon group;
Condition 2: $M_1$ represents an alkali metal;
Condition 3: $M_2$ represents a group selected from an alkali metal, a hydrogen atom, a hydrocarbon group and a hydrocarbon group containing an oxygen atom(s);
Condition 4: n represents an integer of 1 or more.

5. The method according to claim 1, wherein the inorganic particles (A) are applied to the yarn at an adhesion rate of the inorganic particles and the phosphate-based compound of 15-30 wt %.

* * * * *